United States Patent
Imai et al.

(10) Patent No.: US 7,333,529 B2
(45) Date of Patent: Feb. 19, 2008

(54) APPARATUS AND METHOD FOR MEASUREMENT OF COMMUNICATION QUALITY IN CDMA SYSTEM

(75) Inventors: Tetsuro Imai, Kanagawa (JP); Shinichi Mori, Kanagawa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 22 days.

(21) Appl. No.: 11/139,185

(22) Filed: May 27, 2005

(65) Prior Publication Data

US 2005/0272460 A1    Dec. 8, 2005

Related U.S. Application Data

(62) Division of application No. 09/827,800, filed on Apr. 6, 2001, now Pat. No. 7,050,482.

(30) Foreign Application Priority Data

| Apr. 6, 2000 | (JP) | .............................. 2000-105485 |
| Apr. 6, 2000 | (JP) | .............................. 2000-105486 |
| Feb. 27, 2001 | (JP) | .............................. 2001-53033 |

(51) Int. Cl.
*H04B 1/00* (2006.01)
(52) U.S. Cl. ...................................... 375/142; 375/150
(58) Field of Classification Search ........ 375/130–148, 375/229, 365, 150
See application file for complete search history.

(56) References Cited

U.S. PATENT DOCUMENTS

| 5,414,730 A | 5/1995 | Lundquist et al. .......... 375/208 |
| 5,805,648 A | 9/1998 | Sutton ........................ 375/367 |
| 6,028,894 A | 2/2000 | Oishi et al. ................ 375/227 |
| 6,493,376 B1 * | 12/2002 | Harms et al. ............... 375/130 |

(Continued)

FOREIGN PATENT DOCUMENTS

EP    0 682 418 A2    5/1995

(Continued)

OTHER PUBLICATIONS

Subspace Based Estimation of the Signal to Interference Ratio for CDMA Cellular Systems Deepa Ramakrishna, Narayan B. Mandayam and Roy D. Yates 1997 IEEE p. 735-739.

(Continued)

*Primary Examiner*—David B. Lugo
(74) *Attorney, Agent, or Firm*—Workman Nydegger

(57) ABSTRACT

In order to perform synchronization detection with high speed, high precision and high reliability and to measure communication quality (propagation characteristics) at high precision and high efficiency, a mobile station (202) includes synchronization detecting portion (221) for detecting synchronization chip timing of channel to be measured, a synchronization chip timing information portion accumulating information of detected synchronization chip timing, a correlation detecting portion (222) deriving a correlation value between spreading code of the channel to be measured and a received signal for performing communication with a base station and measurement of communication quality with taking the detected synchronization chip timing as a reception chip timing, a time series generating portion (223) for generating a time series data of received signal vector after correlation detection, and a communication quality calculating portion (224) for calculating communication quality from generated time series data.

10 Claims, 41 Drawing Sheets

U.S. PATENT DOCUMENTS 6,707,844 B1 * 3/2004 Imaizumi et al. ............ 375/148
6,983,011 B1 * 1/2006 Hara et al. .................. 375/229

FOREIGN PATENT DOCUMENTS

| EP | 0820156 A2 | 2/1998 |
| EP | 0982879 A1 | 3/2000 |
| EP | 0987833 A2 | 3/2000 |
| WO | WO 99/66643 | 12/1999 |

OTHER PUBLICATIONS

Subspace Based Estimation of the Signal to Interference Ratio for TDMA Cellular Systems Michael Andersin, Narayan B. Mandayam, Roy D. Yates 1996 IEEE p. 1155-1159.

Applications of Space-Time Adaptive Processing in Wireless Communications A.M. Haimovich and A. Shah 1997 IEEE p. 1098-1102.

An Improved Detection Technique for Direct-Sequence Code Acquisition in a Rayleigh Fading Mobile Channel Char-Dir Chung 1994 IEEE p. 1691-1695.

Transmit Diversity Schemes for CDMA-2000; Dinesh Rajan, Steven D. Gray, 1999 IEEE, p. 669-673.

Transmit Diversity Using Filtered Feedback Weights in the FDD/WCDMA System; Ari Hottinen and Risto Wichman, 2000 IEEE, p. 15-21.

Downlink Transmit Diversity Schemes for CDMA Networks; John S. Thompson, Peter M. Grant and Bernard Mulgrew, 1999 IEEE, p. 1382-1386.

European Search Report; Application No. EP0707535.4-1525 (13 pages).

* cited by examiner

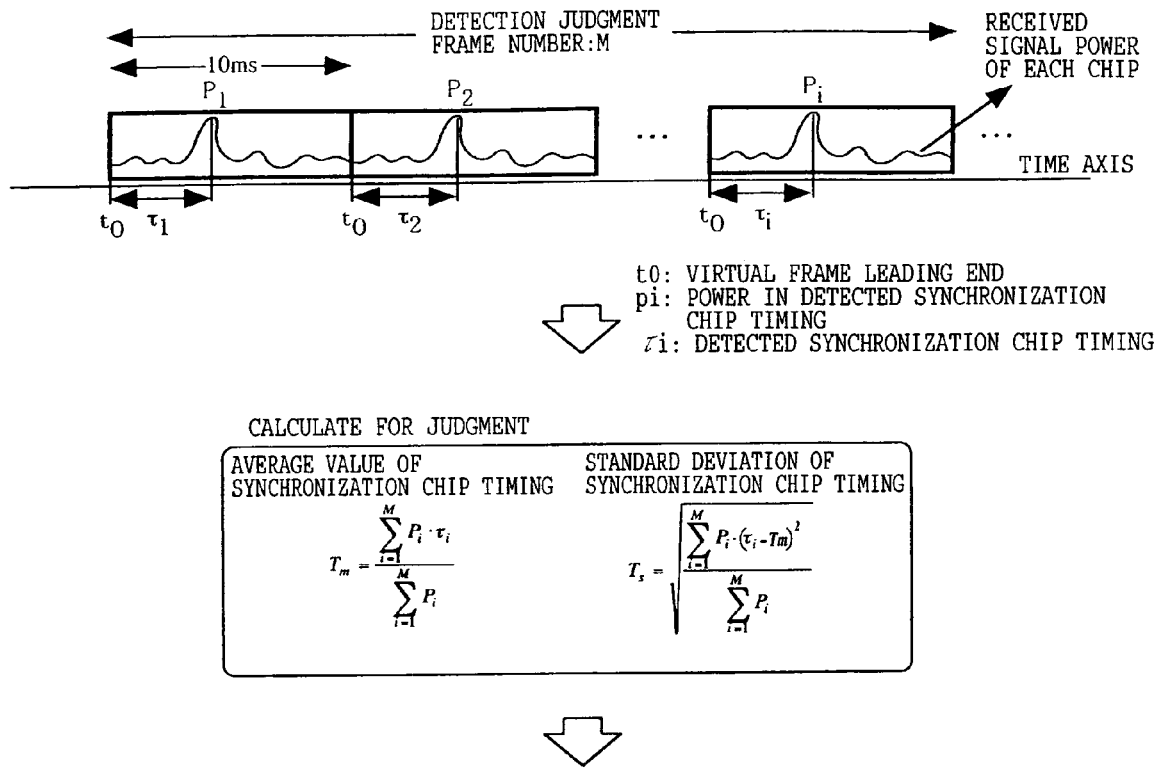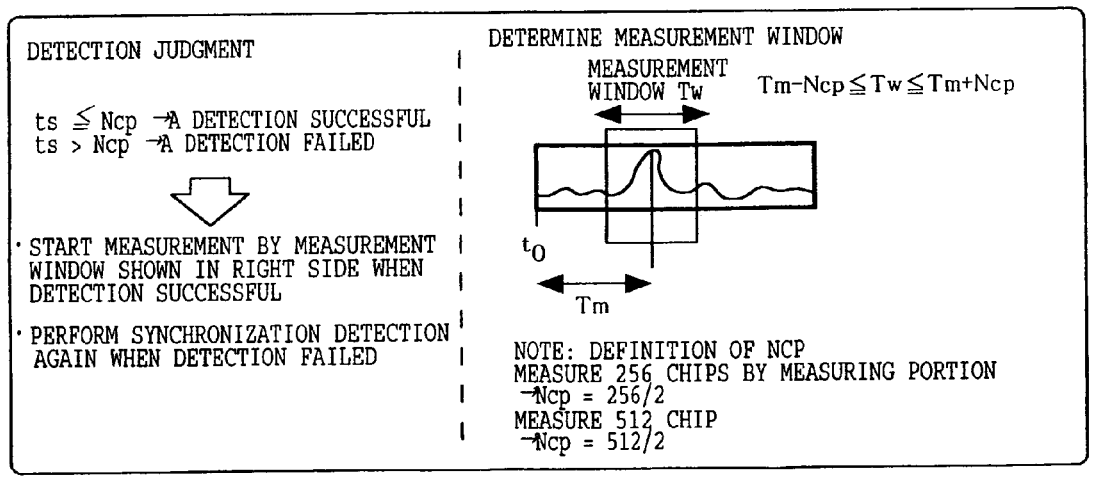
FIG.15

APPARATUS AND METHOD FOR MEASUREMENT OF COMMUNICATION QUALITY IN CDMA SYSTEM

CROSS-REFERENCE TO RELATED APPLICATIONS

This is a divisional application of U.S. patent application Ser. No. 09/827,800 filed Apr. 6, 2001, now U.S. Pat. No. 7,050,482, which is incorporated herein by reference in its entirety. That application claims priority under 35 U.S.C. 119 to Patent Application Nos. 2000-105485 filed Apr. 6, 2000, 2000-105486 filed Apr. 6, 2000, and 2001-53033 filed Feb. 27, 2001, all filed in Japan, and the contents of all of which are incorporate hereinto by reference.

BACKGROUND OF THE INVENTION

1. The Field of the Invention

The present invention relates generally to a method and an apparatus for measurement of communication quality in a mobile communication system using a CDMA cellular system. More particularly, the invention relates to methods and systems for detection of synchronization suitable for measuring communication quality using channels spread by relatively long known spreading code constantly transmitted by installed base stations.

2. The Relevant Technology

In CDMA cellular systems, it is required to detect a synchronization chip timing of a channel to measure, namely a reception chip timing in conventional measurement of communication quality (propagation characteristics). It should be noted that the reception chip timing is premised to match with a position of a path between transmitter and receiver in time effective for communication. Next, for setting a correlation detector called as finger for the reception chip timing for deriving a received signal vector in the reception chip timing from a correlation value.

FIG. 1 shows a process for deriving a desired signal power and an interference signal power. The signal vector set forth above is a sum of the desired signal and the interference signal. Therefore, a received signal vector obtained within a certain given period (normally about 3 to 5 symbols) is summed and averaged to take obtained vector as a desired signal vector. The desired signal power is derived as a power of the desired signal vector. The interference signal vector is derived from a variance of the received signal vector with taking the desired signal vector as reference. Here, the chip length to be used in correlation is referred to as one symbol.

Effective paths between transmitter and receiver presents in about three to five paths in urban area in general (here, chip rate is about 4 Mcps). Accordingly, in order to obtain the desired signal power, the interference signal power and SIR for all of the effective paths, corresponding number of fingers are required to be not effective. On the other hand, vector averaging is included during process of measurement, it is essential that the symbol to be used for averaging is "a symbol which can be regarded to have the same phase of the desired signal vector". Normally, the symbol continuous in time is used. However, the condition is different when a transmit diversity is applied to the channel to be measured.

For example, when the channel to be measured is taken as a common pilot channel when the transmit diversity is applied, at first, the received signal vector after correlation detection is added and subtracted by preceding and following symbols to separate into received signal vector per each transmission antenna. Next, the desired signal power and the interference signal power are derived by performing the foregoing calculation per each received signal vector. By combining the desired signal power and the interference signal power obtained for each transmission antenna, the desired signal power and the interference signal power upon use of the transmit diversity is derived.

During this process, the received signal vector for each transmission antenna can be obtained only at every two symbol period. Accordingly, number of samples to be used in averaging, namely number of received signal vectors, becomes smaller in comparison with the case where the transmit diversity is not applied, to degrade measurement precision for each transmission antenna. When number of samples is set to be the same number as that when the transmit diversity is not applied, phase variation of the desired signal vector due to fading becomes not ignorable. Naturally, the measurement precision for each transmission antenna is lowered, the measurement precision after final combination is also lowered.

On the other hand, when a measurement system is installed on a mobile measurement vehicle for measuring communication quality while moving, the path position between transmitter and receiver is moved per each path according to movement of the mobile measurement vehicle. Accordingly, upon measuring, detection of reception chip timing has to be constantly performed and position of the finger has to be updated. When updating speed is low relative to movement of the path, the reception chip timing and path position can be offset. Therefore, obtained measured value cannot be correct.

As a method for detection of synchronization chip timing, namely a method that the mobile equipment detects of synchronization with the connecting base station at a preceding stage to perform measurement of communication quality, so-called 3-step cell search method is used in a wide band CDMA (hereinafter referred to as W-CDMA) cellular system. More particularly, so-called 3-step cell search method is a method performing detection of synchronization using three channels of PSCH (Primary Synchronization CHannel), SSCH (Secondary Synchronization CHannel), CPICH (Common Pilot CHannel) transmitted from the base station. A cause why three channels are used by the 3-step cell search method is that the code of the channel transmitted from the base station (scrambling code) is unknown.

However, in measurement system or the like, in which the base station as object for measurement (objective scrambling code), the 3-step cell search method cannot be effective synchronization detection method. For example, when CPICH transmitted from the base station is used as channel to be measured, detection of synchronization may be performed by using only scrambling code, in which CPICH of the base station as object for measurement is spread.

On the other hand, when it is not necessary to perform communication between the base station and the mobile equipment immediately after detection of synchronization and when the synchronization chip timing may be determined with a certain range, complete synchronization detection is not required. Furthermore, it is possible to perform measurement of a service area by installing pseudo base station in advance of actual installation of the base station. In such case, it is not efficient to transmit three channels corresponding PSCH, SSCH and CPICH by the pseudo base station for measurement.

By the conventional method, for measuring communication quality (propagation characteristics) at high precision, correlation detectors called as fingers are provided in number corresponding to number of the paths, and installation position of each finger (reception chip timing) has to be certainly matched with the position of the path. Also, it is not efficient for constraint condition for number of samples and sampling interval upon deriving the desired signal power, the interference signal power in each reception chip timing.

On the other hand, it is not efficient in that number of samples and sampling interval are different depending upon whether transmit diversity is applied or not.

Furthermore, in the conventional method, upon performing detection of synchronization of the channel to be measured, channel other than the channel to be measured is required to be inefficient.

BRIEF SUMMARY OF THE INVENTION

The principles of the present invention provides a solution for the problems set forth above. It is therefore an object of the present invention to provide a synchronization detecting method and apparatus which can perform detection of synchronization for measurement at high speed, high precision and high reliability. A further object of the present invention is to provide a synchronization detecting method and apparatus which can perform detection of synchronization for measurement at high speed, high precision and high reliability while transmit diversity is applied.

According to a first embodiment of the present invention, for measuring communication quality in a mobile receiving station in a mobile communication system employing a CDMA cellular system, using channel spread with spreading code and constantly transmitted from a base station, a synchronization detecting method in CDMA cellular system comprises the step of: in the mobile receiving station, determining a synchronization chip timing of a channel to be measured by detecting partial correlation value between spreading code to be measured and a received signal. With this method, since the partial correlation value is derived between the spreading code of the channel to be measured and the received signal, three channels are not required for synchronization detection.

According to a second embodiment of the present invention, in the first embodiment, a matched filter is used upon detection of the partial correlation value and a synchronization chip timing of the channel to be measured is detected by sequentially rewriting the code in the matched filter. With this method, synchronization detection using the partial correlation value can be performed at high speed, high precision and high reliability.

According to a third embodiment of the present invention, in the first and second embodiments, an averaging period and sampling period are preliminarily set in advance of performing the synchronization detection, and the synchronization chip timing of the channel to be measured is determined on the basis of a value derived by averaging of detected plurality of partial correlation values in the averaging period by detecting the partial detection values per set sampling period.

According to a fourth embodiment of the present invention, in the third embodiment, upon averaging process of the detected plurality of partial correlation values, the synchronization chip timing of the channel to be measured is determined using an averaged value by preliminarily calculating the averaged value by power averaging process or vector averaging process.

According to a fifth embodiment of the present invention, in the fourth embodiment, the synchronization chip timing of the channel to be measured is determined by enabling setting of process of the averaging process for a plurality of times and using the averaged value derived by a plurality of times of averaging process by the same or different averaging method in each process.

According to the sixth embodiment of the present invention, the steps of performing synchronization chip timing detection process for a plurality of times as defined in any one of the first through fifth embodiments, and making judgment whether synchronization chip timing of a channel to be measured is to be determined using an average value of a plurality of timing value and a standard deviation value, the synchronization chip timing of the channel to be measured is determined with providing a given range, or synchronization detection is to be performed again. With this method, correctness of the detected synchronization chip timing can be easily judged. Also, upon performing measurement of communication quality using the measurement window, position and width of the window can be determined.

According to a seventh embodiment of the present invention, for measuring communication quality in a mobile receiving station in a mobile communication system employing a CDMA cellular system, using channel spread with spreading code and constantly transmitted from a base station, a synchronization detecting device in CDMA cellular system comprises: the mobile receiving station including means for determining a synchronization chip timing of a channel to be measured by detecting partial correlation value between spreading code to be measured and a received signal. With this method, since the partial correlation value is derived between the spreading code of the channel to be measured and the received signal, three channels are not required for synchronization detection.

According to an eighth embodiment of the present invention, in the seventh embodiment, the means includes a matched filter is used upon detection of the partial correlation value and a synchronization chip timing of the channel to be measured is detected by sequentially rewriting the code in the matched filter. With this construction, synchronization detection using partial correlation can be performed at high speed, high precision and high reliability.

According to a ninth embodiment of the present invention, in the seventh and eighth embodiments, the means preliminarily sets an averaging period and sampling period in advance of performing the synchronization detection, and determines the synchronization chip timing of the channel to be measured on the basis of a value derived by averaging of detected plurality of partial correlation values in the averaging period by detecting the partial detection values per set sampling period.

According to a tenth embodiment of the present invention, in the ninth embodiment, upon averaging process of the detected plurality of partial correlation values, the means determines the synchronization chip timing of the channel to be measured using an averaged value by preliminarily calculating the averaged value by power averaging process or vector averaging process.

According to an eleventh embodiment of the present invention, in the tenth embodiment, the means determines the synchronization chip timing of the channel to be measured by enabling setting of process of said averaging process for a plurality of times and using the averaged value derived by a plurality of times of averaging process by the same or different averaging device in each process.

According to a twelfth embodiment of the present invention, a synchronization detecting device in a CDMA cellular system comprises means for performing synchronization chip timing detection process for a plurality of times as defined in any one of the seventh through eleventh embodiments, and making judgment whether synchronization chip timing of a channel to be measured is to be determined using an average value of a plurality of timing value and a standard deviation value, the synchronization chip timing of the channel to be measured is determined with providing a given range, or synchronization detection is to be performed again. With this method, correctness of the detected synchronization chip timing can be easily judged. Also, upon performing measurement of communication quality using the measurement window, position and width of the window can be determined.

According to a thirteenth embodiment of the present invention, in a mobile communication system employing CDMA cellular system using a common pilot channel constantly transmitted from a base station in a mobile communication system upon use of transmit diversity for measuring communication quality in a mobile station being measured, a synchronization detecting device comprises: the mobile station separating received signal vector obtained by correlation detection of received signal per symbol into received signal vector per transmission antenna by performing addition and subtraction before and after symbol, and determining synchronization chip timing on the basis of a value derived by addition of the received signal vector in power. With this method, since the partial correlation value is derived between the spreading code of the channel to be measured and the received signal, three channels are not required for synchronization detection.

According to a fourteenth embodiment of the present invention, in the thirteenth embodiment, the synchronization chip timing is determined on the basis of a value derived by addition of an average vector derived by averaging received signal vector per each of a plurality transmission antenna obtained over a plurality of period with taking a unit where symbol pattern of signals transmitted from a plurality of transmission antenna becomes orthogonal between antennas.

According to a fifteenth embodiment of the present invention, a synchronization detecting method in a CDMA system determines synchronization chip timing on the basis of a value derived by performing synchronization chip timing detection process defined in the thirteenth or fourteenth embodiments for a plurality of times and performing addition of obtained plurality of powers.

According to a sixteenth embodiment of the present invention, in a mobile communication system employing CDMA cellular system using a common pilot channel constantly transmitted from a base station in a mobile communication system upon use of transmit diversity for measuring communication quality in a mobile station being measured, a synchronization detecting device comprises: the mobile station separating received signal vector per separating received signal vector obtained by detecting correlation per symbol by performing addition and subtraction before and after symbol, and determining synchronization chip timing on the basis of a value derived by addition of the received signal vector in power. With this method, since the partial correlation value is derived between the spreading code of the channel to be measured and the received signal, three channels are not required for synchronization detection.

According to the seventeenth embodiment of the present invention, in the sixteenth embodiment, the means determines the synchronization chip timing on the basis of a value derived by addition of an average vector derived by averaging received signal vector per each of a plurality transmission antenna obtained over a plurality of period with taking a unit where symbol pattern of signals transmitted from a plurality of transmission antenna becomes orthogonal between antennas.

According to an eighteenth embodiment of the present invention, a synchronization detecting device in CDMA system determining synchronization chip timing on the basis of a value derived by performing synchronization chip timing detection process defined in sixteenth and seventeenth embodiments for a plurality of times and performing addition of obtained plurality of power.

As set forth above, according to the present invention, since only the channel to be measured is used, synchronization detection for measurement can be done at high speed, high precision and high reliability. Also, in case of synchronization detection under the premise of communication quality measurement using the measurement window, only the position and window width of the measurement window is required. Thus, complete synchronization detection is not required.

Furthermore, according to the present invention, even when transmit diversity is applied, synchronization detection is possible at high speed, high precision and high reliability. Also, measurement of the communication quality at high precision can be done at high speed and high efficiency.

The above and other objects, effects, features and advantages of the present invention will become more apparent from the following description of embodiments thereof taken in conjunction with the accompanying drawings.

BRIEF DESCRIPTION OF THE DRAWINGS

FIG. 15 is an illustration showing a principle of operation of the fourth embodiment of a synchronization detecting method according to the present invention;

DETAILED DESCRIPTION OF THE PREFERRED EMBODIMENTS

At first, detection of synchronization as a method for detecting a synchronization chip timing will be explained and then measurement of communication quality will be explained.

(1) Synchronization Detecting Method

Figure 1:
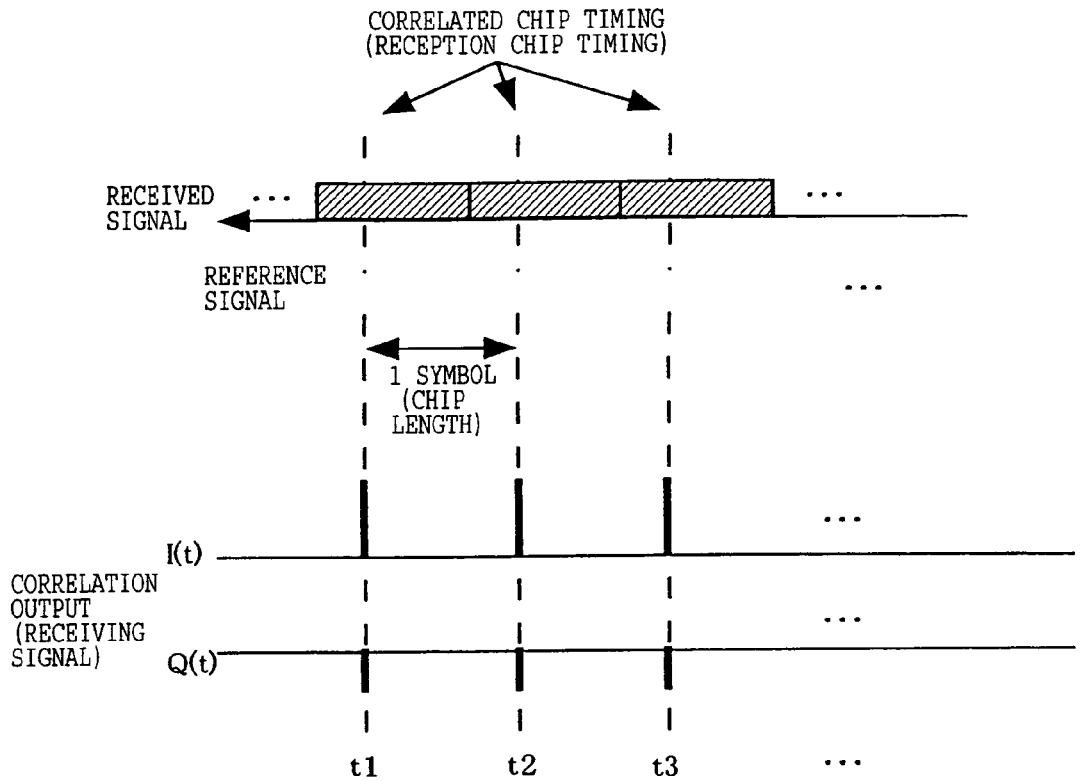
FIG. 1 is an illustration showing a process for deriving a desired signal power and an interference signal power.
Figure 2:
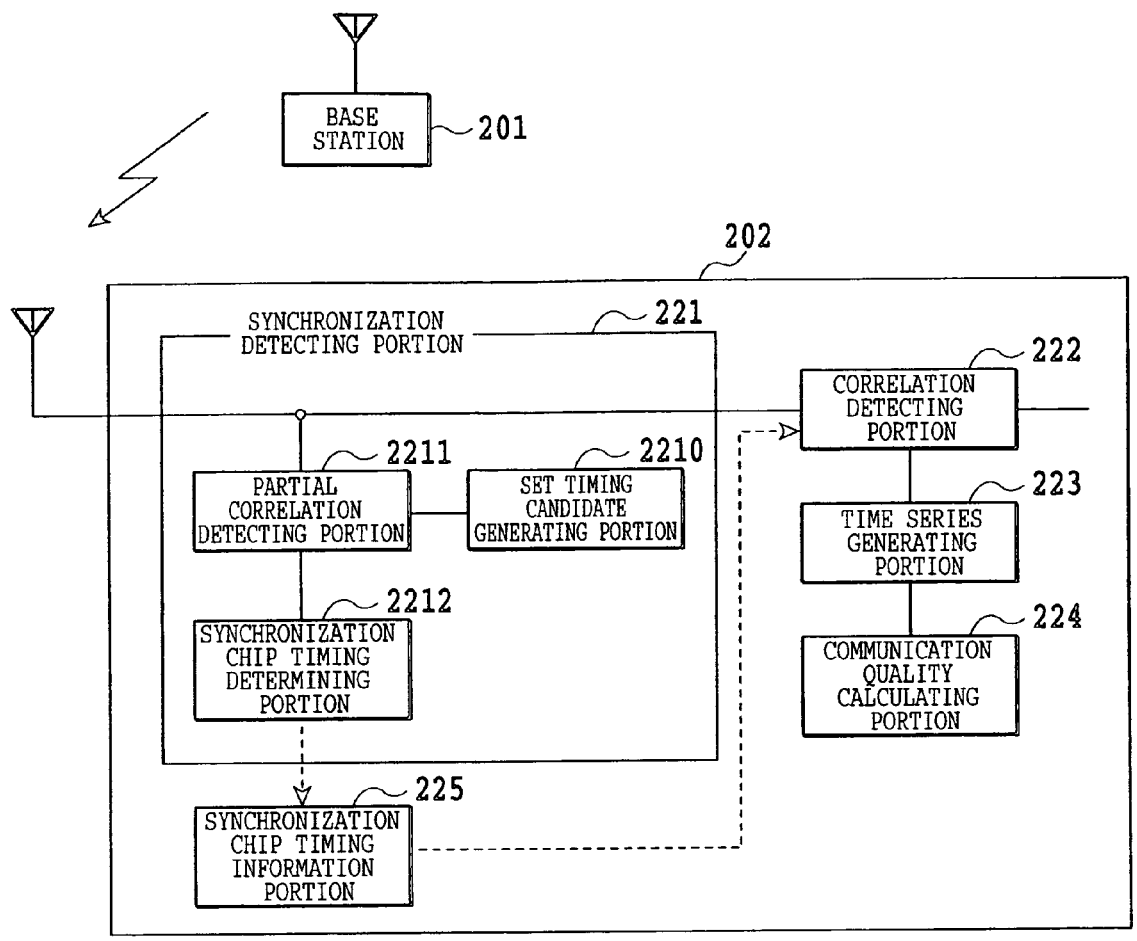
FIG. 2 is a block diagram showing an overall construction of a W-CDMA type mobile communication system, to which the present invention is applied.

FIG. 2 shows an overall construction of a W-CDMA type mobile communication system, to which the present invention is applied. The mobile communication system is constructed with a base station 201 and a mobile station 202. The mobile station 202 includes a synchronization detecting portion 221 detecting a synchronization chip timing of a channel to be measured for communication with the base station and measuring a communication quality, a synchronization chip timing information portion 225 for accumulating information of detected synchronization chip timing, a correlation detecting portion 222 for deriving a correlation value between a spreading code of the channel to be measured and a received signal for communication with the base station and measuring of communication quality, a time series generating portion 223 for generating a time series data of a received signal vector after correlation detection, and a communication quality calculating portion 224 for calculating a communication quality from the generated time series data. The synchronization detecting portion 221 includes a synchronization timing candidate generating portion 2210 for establishing blocks of all chip timings which can be synchronized and generating synchronization timing candidates, a partial correlation detecting portion 2211 deriving a partial correlation with a reception signal for the synchronization timing candidate, and a synchronization chip timing determining portion 2212 for determining synchronization chip timing from the partial correlation values of respective candidate timings.

Figure 3:
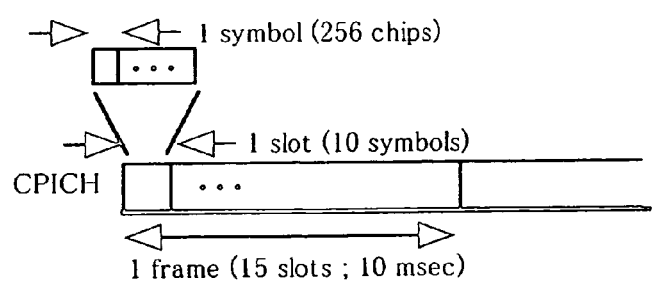
FIG. 3 is an illustration showing a frame construction of CPICH.

FIG. 3 shows a frame construction of CPICH (common pilot channel). In one frame, a hundred fifty symbols are contained. One frame is 10 msec. period. In the shown embodiment, as the channel to be measured, CPICH constantly transmitted from each base station is used. Namely, in the synchronization detecting method using only channel to be measured, the partial correlation between the spreading code of the channel to be measured and the received signal and a peak value where the partial correlation becomes maximum, is derived for detecting synchronized chip timing. Here, a matched filter is used for correlation detection and the partial correlation value is derived with sequentially varying the code to be written for achieving high speed synchronization chip timing.

While other embodiments will be explained later, improvement of precision of the synchronization detection can be achieved by averaging the obtained correlated value at every given interval and detecting the synchronization chip timing. Furthermore, reliability can be improved by repeating detection of synchronization chip timing for several times and determining the synchronization chip timing to be an object for measurement using the detected values of the synchronization chip timing, determining the synchronization chip timing with providing a certain range, or by making judgment whether synchronization detection has to be performed again or not.

On the other hand, in the embodiment of synchronization detection which will be described later, a time resolution of a synchronization timing is assumed as one chip length for simplification. However, when the synchronization timing is detected in greater detail, the synchronization detection method according to the present invention may be performed with setting sampling rate at X times of that in one chip length for over-sampling.

Figure 4:
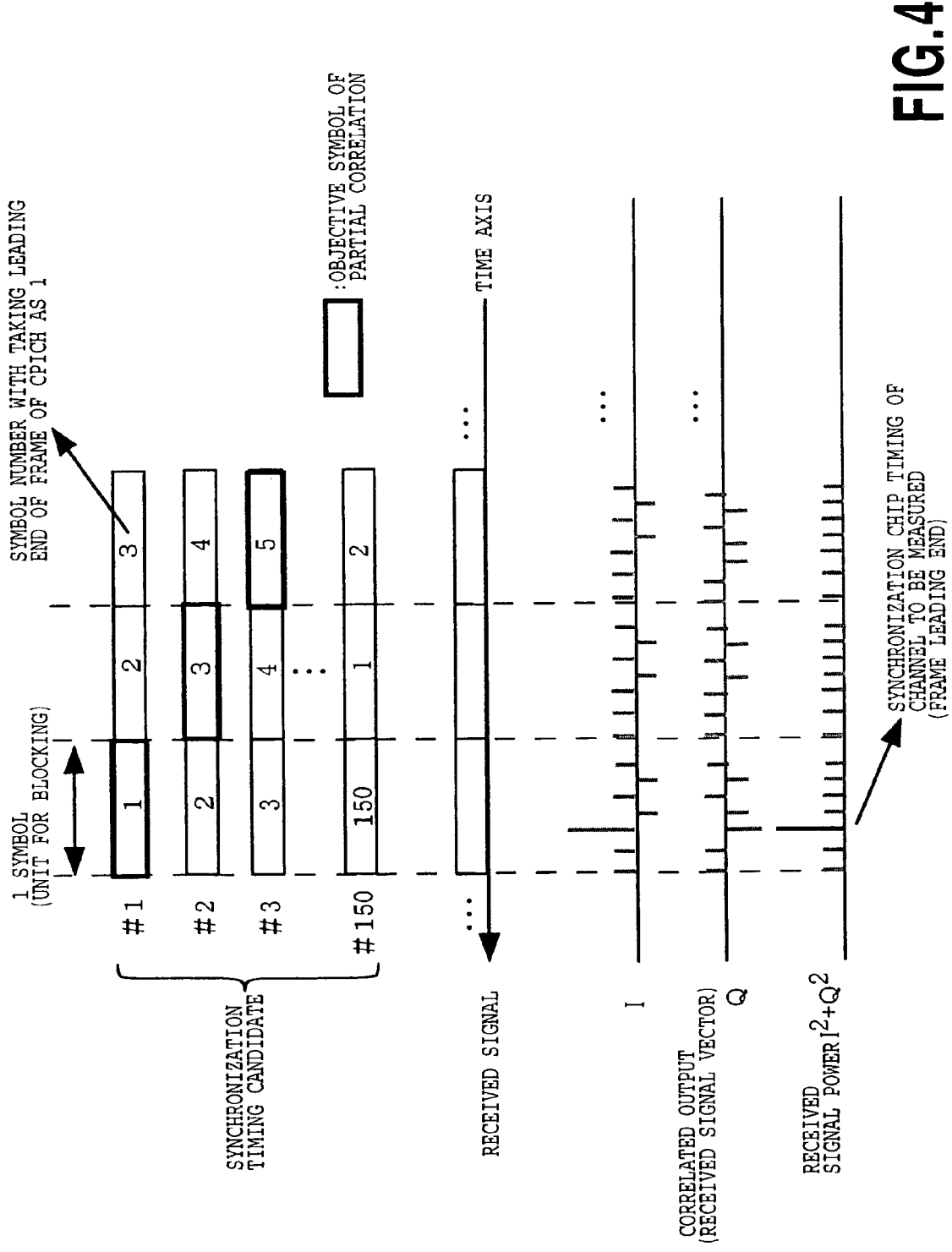
FIG. 4 is an illustration showing a principle of operation of the first embodiment of a synchronization detecting method according to the present invention.

FIG. 4 shows a principle of operation of the first embodiment of the synchronization detection method according to the present invention. In the first embodiment, an object for partial correlation is set at 256 chip length. When CPICH is taken as the channel to be measured, a chip timing, at which synchronization can be established, is 38400. Initially, the chip timing are blocked per symbol. Then, as synchronization timing, 150 candidates are generated with reference to symbol numbers of leading ends of the frames. Thereafter, partial correlation between each code of synchronization timing candidate and the received signal is sequentially derived as shown in FIG. 4 to obtain a power delay file per each synchronization timing candidate. Finally, chip timing where a candidate having the maximum peak among respective of obtained candidates of power delay profiles, is retrieved to take the obtained timing as the synchronization chip timing of the channel to be measured.

In W-CDMA system, a plurality of channels are transmitted at the same frequency, all channels other than the channel to be measured become interfering channels. Considering process gain, power of the interference signal is restricted for chip length to be used for ordinary correlation detection. In the embodiment shown in FIG. 4, partial correlation is performed at 256 chip length (1 symbol=256 chips), the process gain is 256, and an average power of the interference signal becomes 1/256.

In the first embodiment of the synchronization detection method, when the received signal power of the chip timing matching with an effective path position for communication is higher than or equal to a received signal power at other timing, detection of the synchronization chip timing is successful. Accordingly, by setting the chip length (unit for blocking) for partial correlation longer, probability of success in detection of the synchronization chip timing becomes higher.

Figure 5:
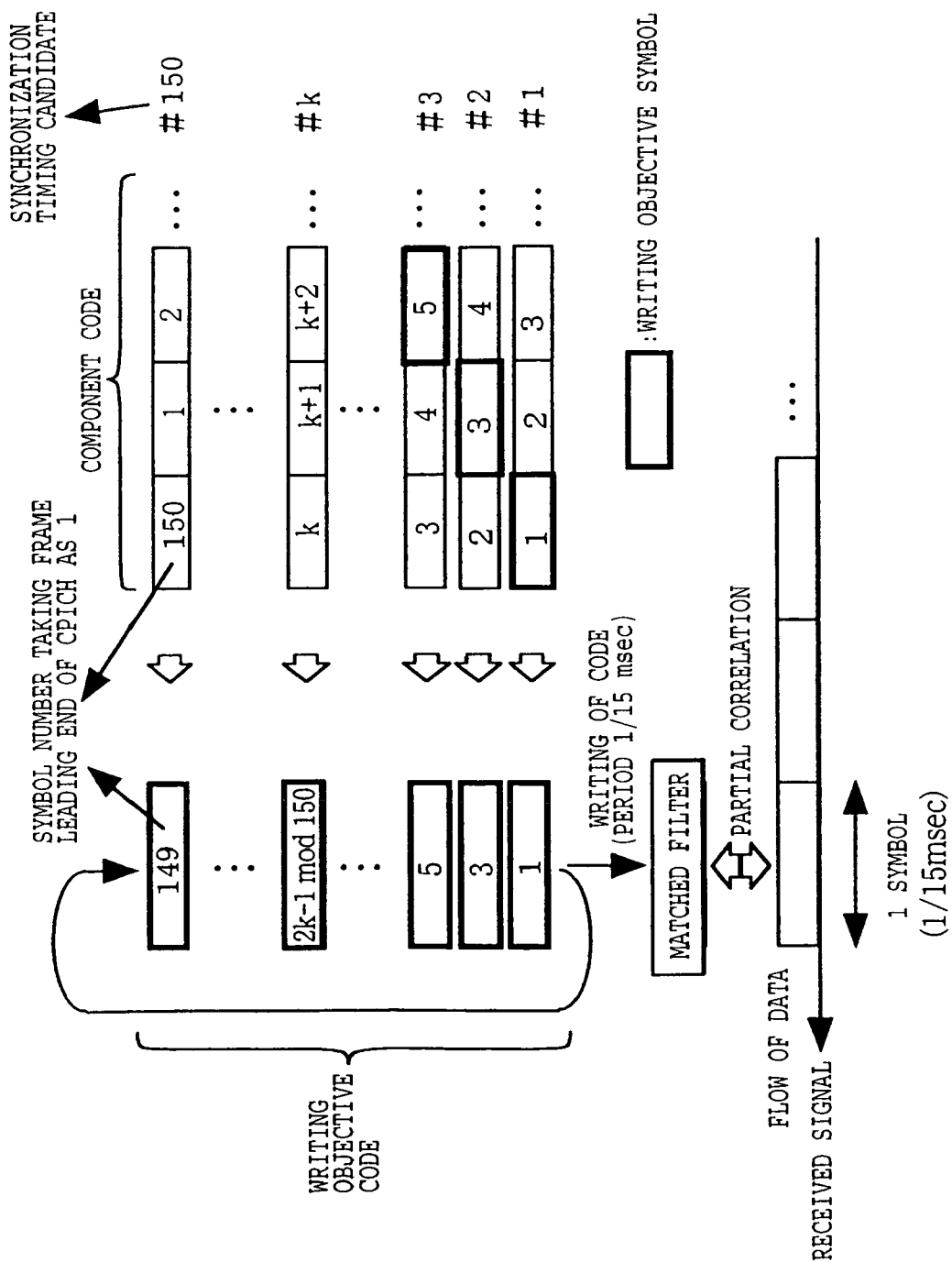
FIG. 5 is an explanatory illustration of an operation in the case when a matched filter is used in a correlation detecting portion of a mobile station, to which the present invention is applied.

FIG. 5 is explanatory illustration of operation in the case where a matched filter is used in the correlation detecting portion of the mobile station, to which the present invention is applied. The matched filter is used for calculation of partial correlation to rewrite code in the matched filter per $\frac{1}{15}$ msec. As shown in FIG. 5, rewriting code to be written in the matched filter is consisted of 256 chips extracted among 150 timing candidates #1 to #150.

By the first embodiment, a period required for detecting the synchronization chip timing can be 10 msec.

Next, the second embodiment of the synchronization detection method will be explained. In the second embodiment, equalizing process in the synchronization detecting portion 221 shown in FIG. 2 will be described. In the mobile communication system, it is generally influenced by multipath fading, the power of the received signal (correlation detected value) fluctuates significantly. Also, since partial correlation is used for correlation detection, precision in correlation detection is not always high.

Figure 6:
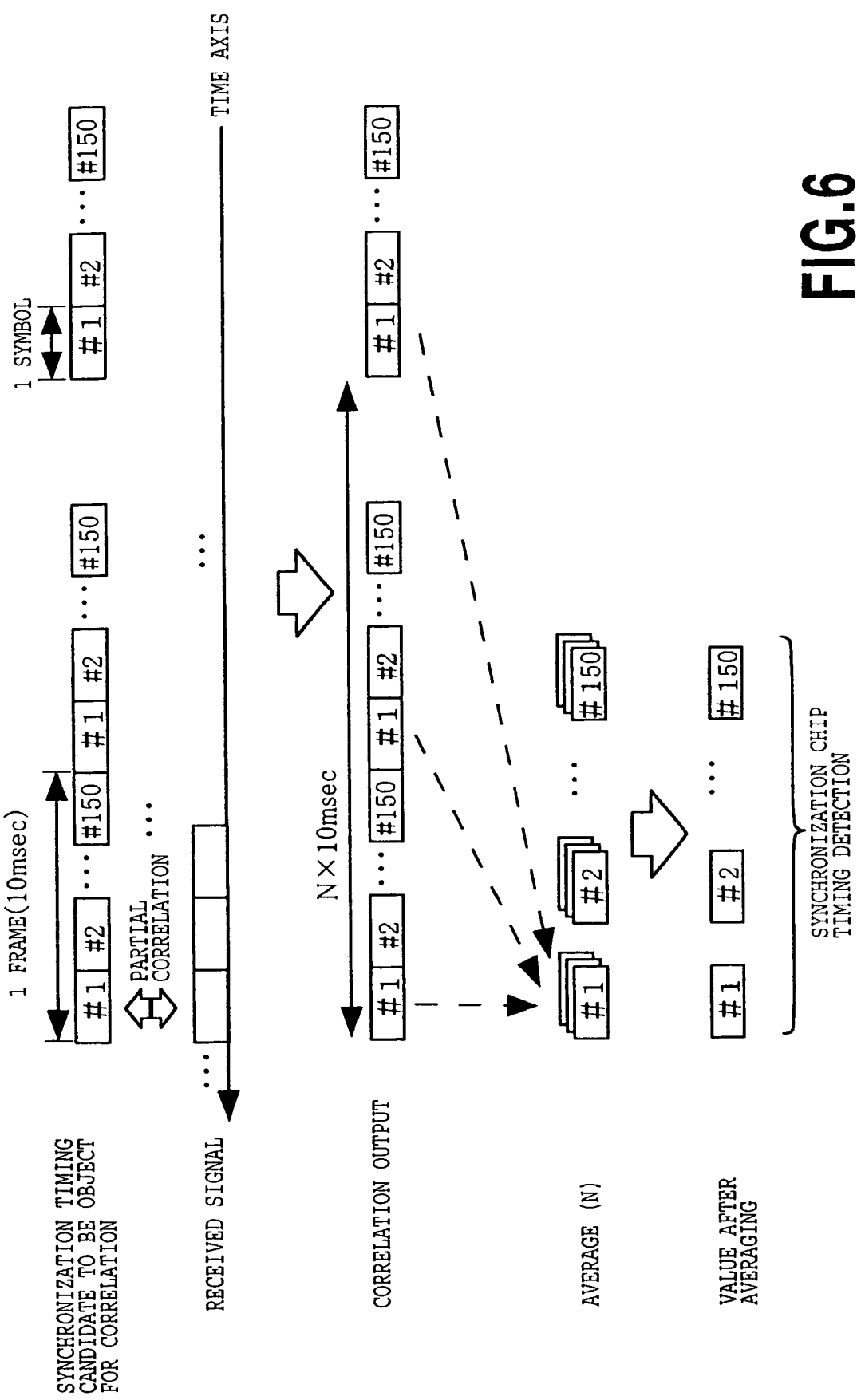
FIG. 6 is an illustration showing a principle of operation of the second embodiment of the synchronization detecting method according to the present invention.

FIG. 6 shows principle of operation of the second embodiment of the synchronization detection method according to the present invention. In the second embodiment, the partial correlation value of each synchronization timing candidate within a given period is averaged to detect synchronization chip timing using obtained average value. Accordingly, assuming that number of samples of respective timing candidate within the equalizing period is N, a period required fir detection of the synchronization chip timing becomes N*10 msec. As an averaging method, there are a method to perform power averaging process and a method to perform vector averaging process.

Figure 7:
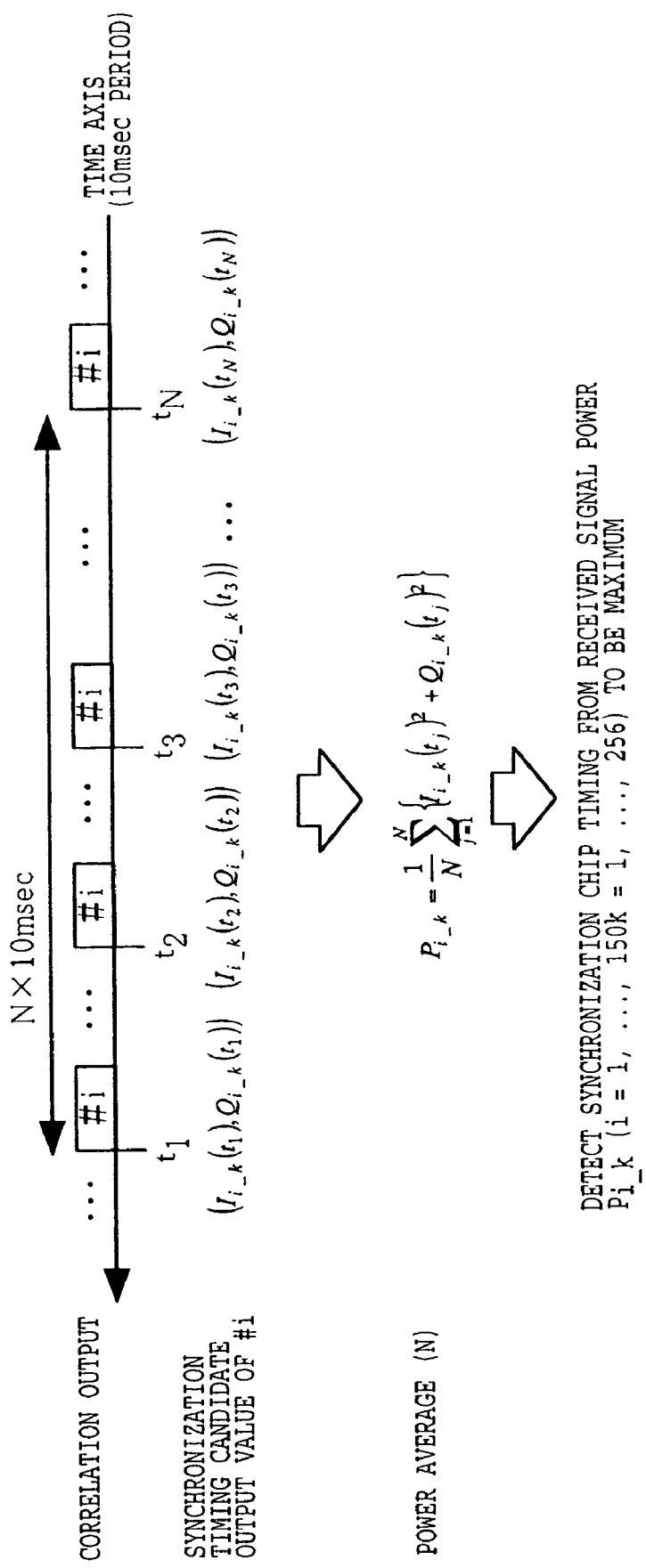
FIG. 7 is an illustration showing the case where a power averaging process as an equalizing process in the second embodiment of the synchronization detection method.

FIG. 7 shows the case where the power averaging process is performed as equalizing process in the second embodiment of the synchronization detecting method. A received signal vector at a timing t of the synchronization timing candidate #i and its chip number k in the symbol, is assumed as $(I_{i\_k}(t), Q_{i\_k}(t))$, the synchronization timing candidate after equalization is #i, and a power at chip number k in its symbol is assumed as $P_{i\_k}$.

In the power averaging process, the instantaneous received signal power is calculated from the received signal vector of each synchronization timing candidate, and subsequently, N in number of the calculated received signal power is averaged per synchronization timing candidate. By the power value after equalization thus obtained, the synchronization chip timing of the channel to be measured is determined. The power averaging process is characterized in that when sample number N is increased, a standard deviation of the received signal power at a timing other than the true synchronization chip timing becomes smaller (note that the average value is held unchanged).

Figure 8:
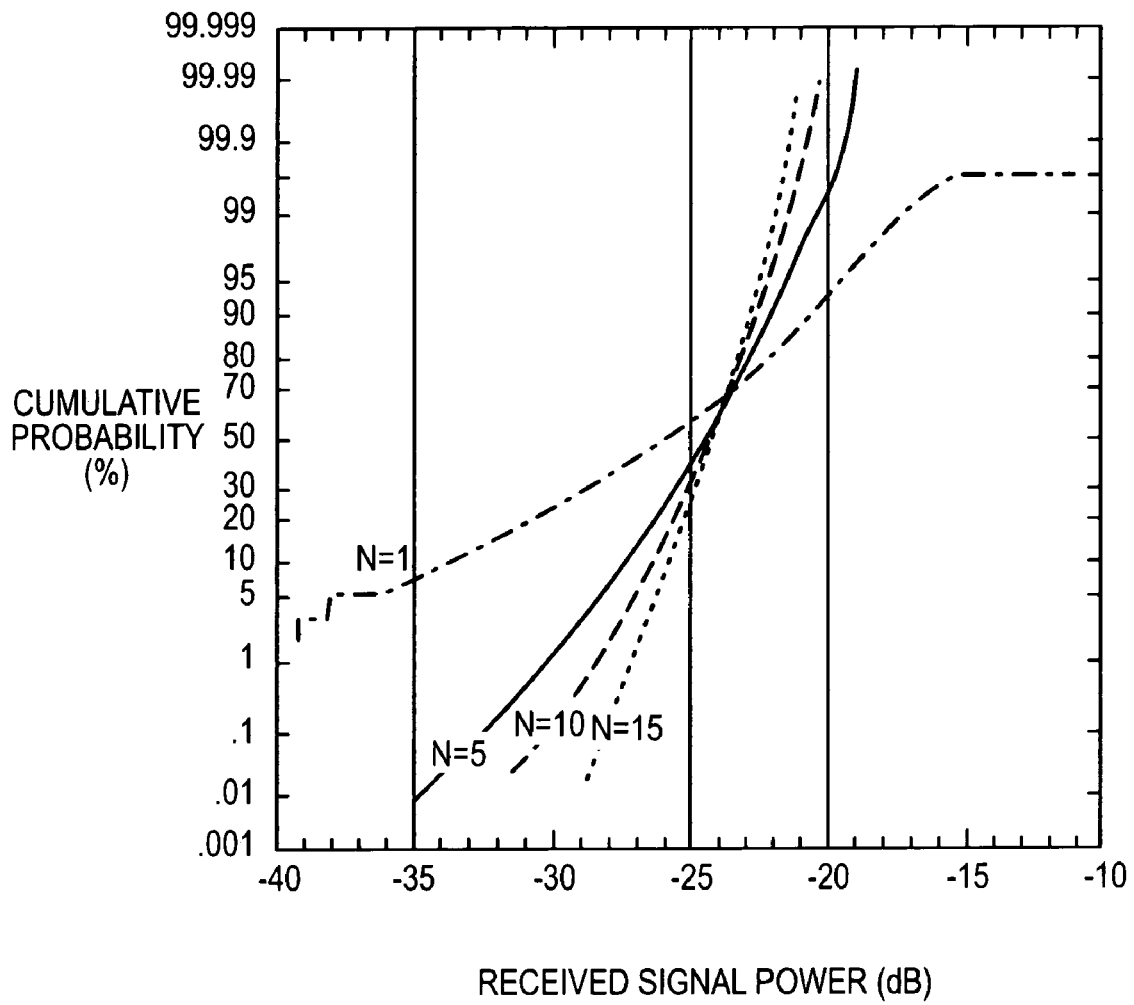
FIG. 8 is an illustration showing a received signal power distribution after power averaging process as the equalizing process.

FIG. 8 shows a received signal power distribution after performing power averaging process as the equalizing process. After detection of partial correlation for a certain scrambling code at 256 chip length and averaging power in sample number 5, 10 and 15, FIG. 8 shows a distribution of the power value of the received signal at a timing other than true synchronization chip timing. However, fading is not added. As can be appreciated from FIG. 8, when the sample number N is increased, the standard deviation of the power value of the received signal in the true synchronization chip timing becomes smaller. As a result, probability of success of detection of synchronization becomes high.

Figure 9:
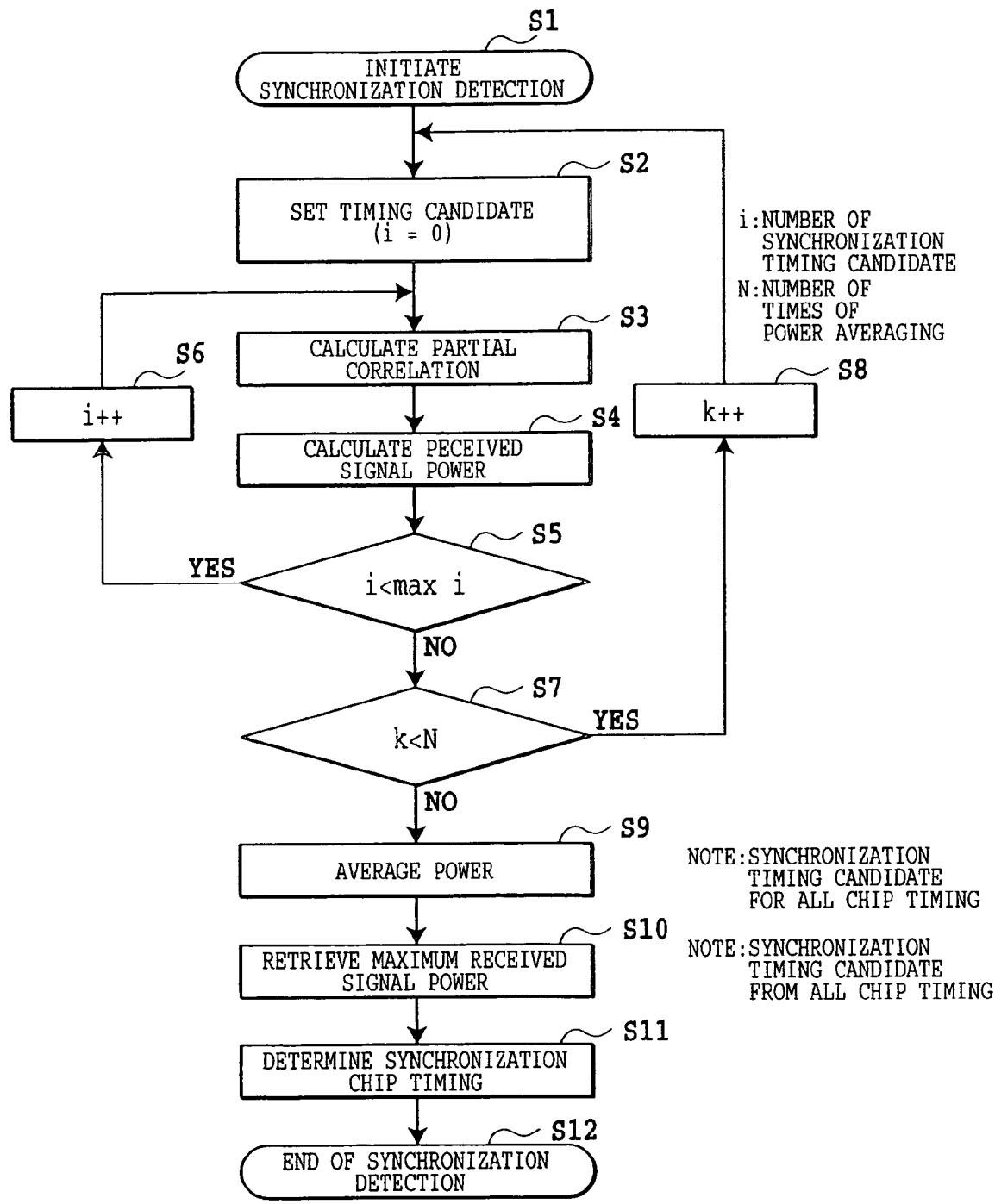
FIG. 9 is a flowchart showing a synchronization chip timing detection procedure by the power averaging process.

FIG. 9 shows a synchronization chip timing detection procedure in the power averaging process. At step S1, synchronization detection is initiated. At step S2, synchronization timing candidate is set (i=0). At step S3, partial correlation calculation is performed. At step S4, received signal power is calculated. At step S5, check is performed whether i<max i is satisfied or not. At step S6, i is incremented. At step S7, check is performed whether k<N is satisfied or not. At step S8, k is incremented. At step S9, power averaging is performed at all synchronization timing candidate or all chip timing. At step S10, retrieval of the maximum power of the received signal is performed for all synchronization timing candidate or all chip timing. At step S11, the synchronization chip timing is determined. At step S12, synchronization detection is terminated.

Figure 10:
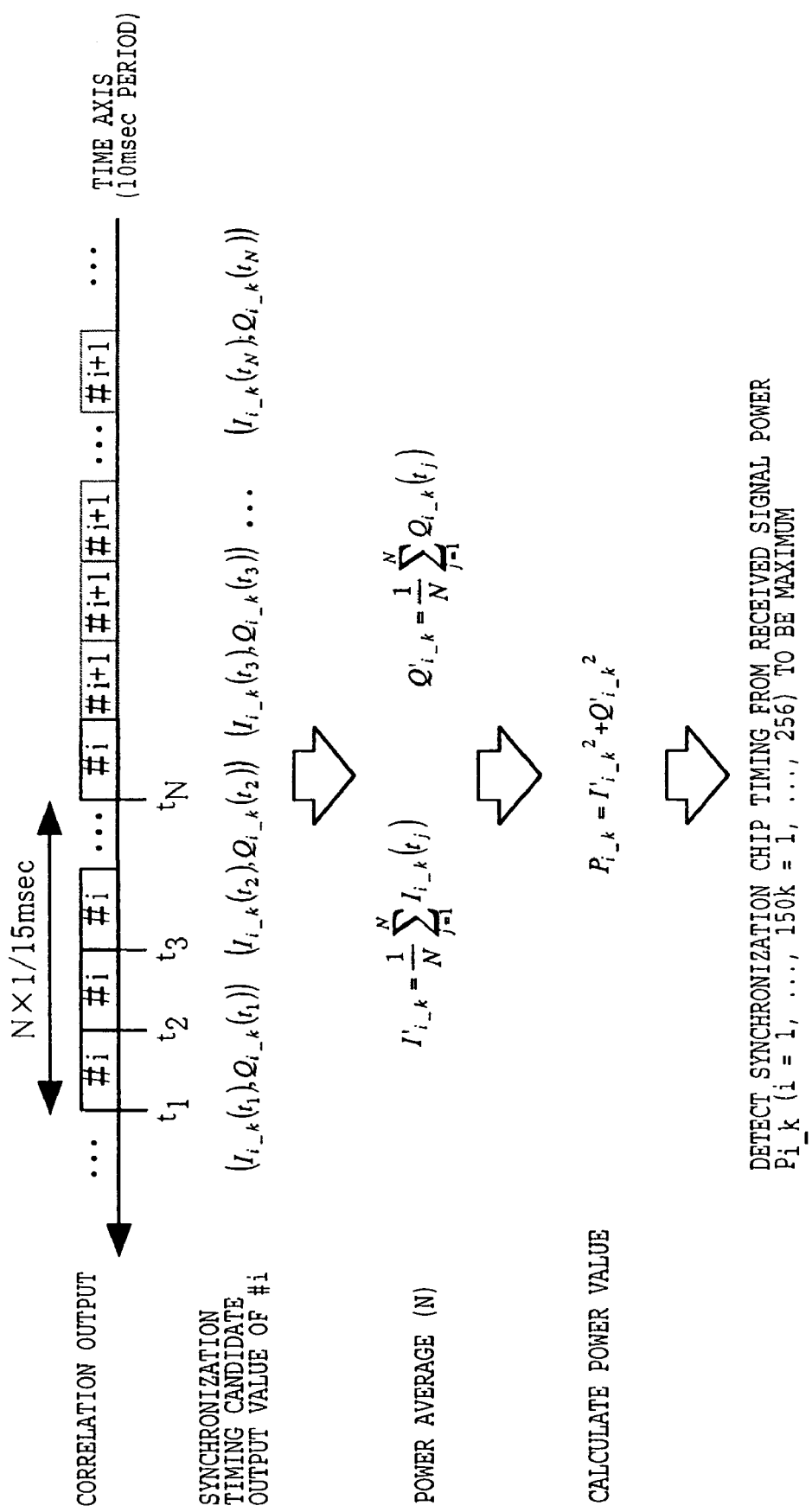
FIG. 10 is an illustration of the case where vector averaging process is performed as equalizing process in the second embodiment of the synchronization detecting method.

FIG. 10 shows the case where the vector averaging process as the equalizing process in the second embodiment of the synchronization detection method. In the vector averaging process, the received signal vector of each synchronization timing candidate is averaged respectively on I side and Q side (N in number). Subsequently, the received signal power is calculated from the values of I and Q after averaging, the synchronization chip of the channel to be measures is determined. Since the vector averaging process is premised in that the phase rotation of the desired signal vector due to fading in the averaging period can be ignored, in the example shown in FIG. 10, a sampling interval per one synchronization timing candidate is set at 1/15 msec.

In the foregoing vector averaging process, by increasing number of samples to be averaged, the average value of the power of the received signal other than the true synchronization chip timing becomes small (standard deviation is unchanged).

Figure 11:
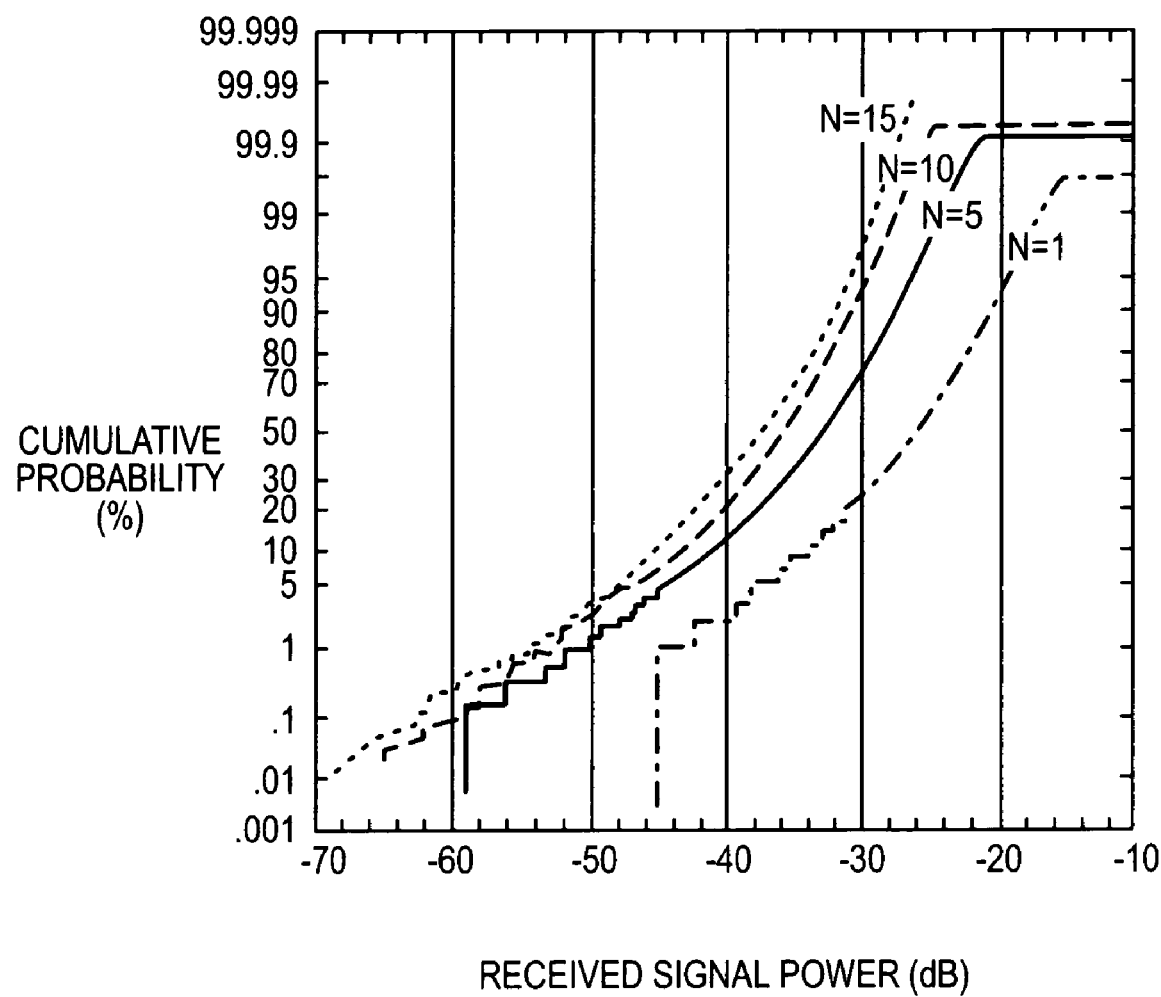
FIG. 11 is an illustration showing a distribution after performing vector averaging process as equalizing process.

FIG. 11 shows a received signal power distribution after performing vector averaging process as the equalizing process. After detection of partial correlation for a certain scrambling code at 256 chip length and averaging power in sample number 5, 10 and 15, FIG. 11 shows a distribution of the power value of the received signal at a timing other than true synchronization chip timing. However, fading is not added. As can be appreciated from FIG. 11, when the sample number N is increased, the average value of the power of the received signal in the true synchronization chip timing becomes smaller. As a result, probability of success of detection of synchronization becomes high.

Figure 12:
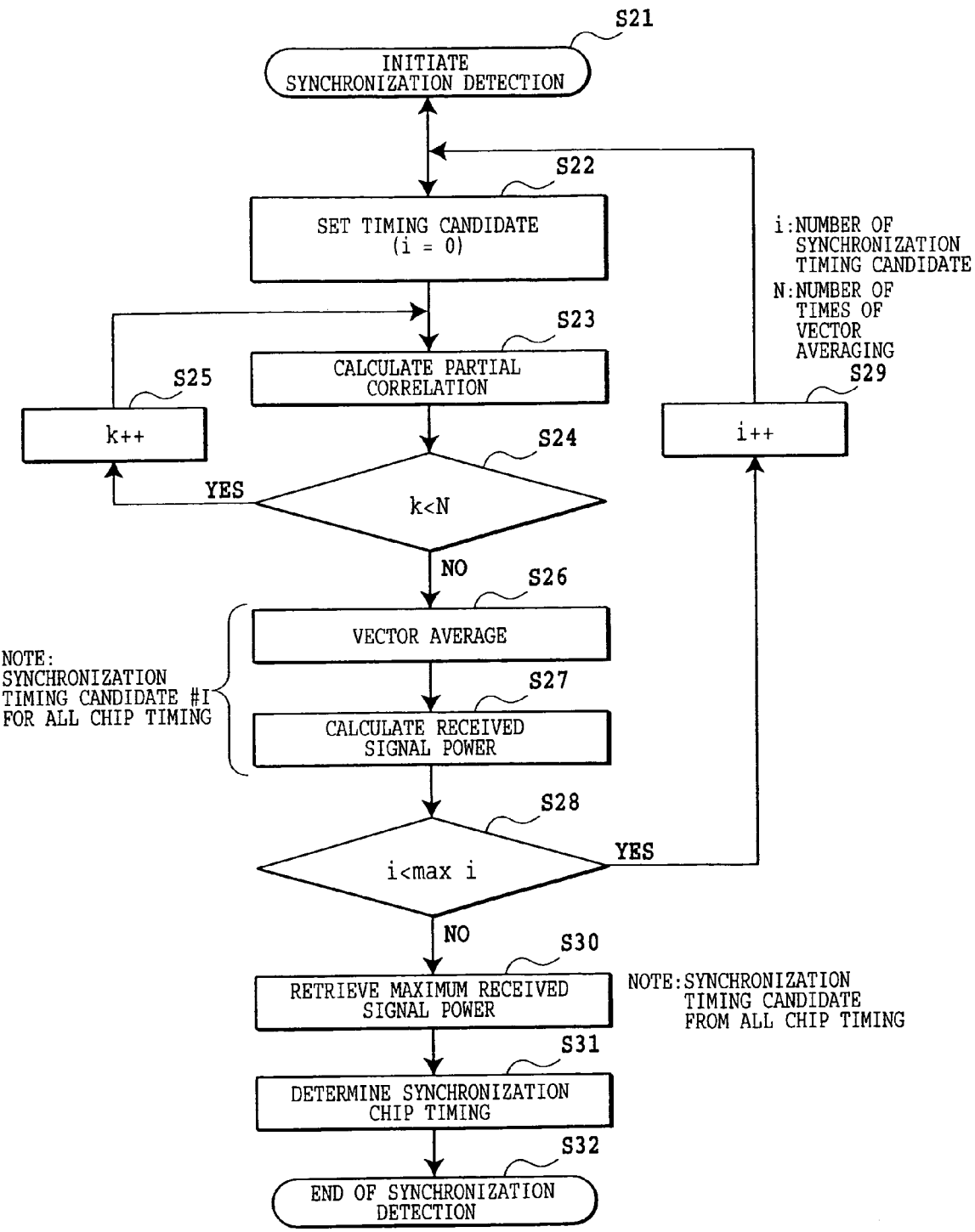
FIG. 12 is a flowchart showing a synchronization chip timing detection procedure by the vector averaging process.

FIG. 12 shows a synchronization chip timing detection procedure in the vector averaging process. At step S21, synchronization detection is initiated. At step S22, synchronization timing candidate is set (i=0). At step S23, partial correlation calculation is performed. At step S24, check is performed whether k<N is satisfied or not. At step S25, k is incremented. At step S6, vector average is derived for all chip timing of synchronization timing candidate #i. At step S27, the power values are calculated for all chip timing of the synchronization timing candidate #i. At step S28, check is performed whether i<max i is satisfied or not. At step S29, i is incremented. At step S30, retrieval of the maximum power of the received signal is performed for all synchronization timing candidate or all chip timing. At step S31, the synchronization chip timing is determined. At step S32, synchronization detection is terminated.

Figure 13:
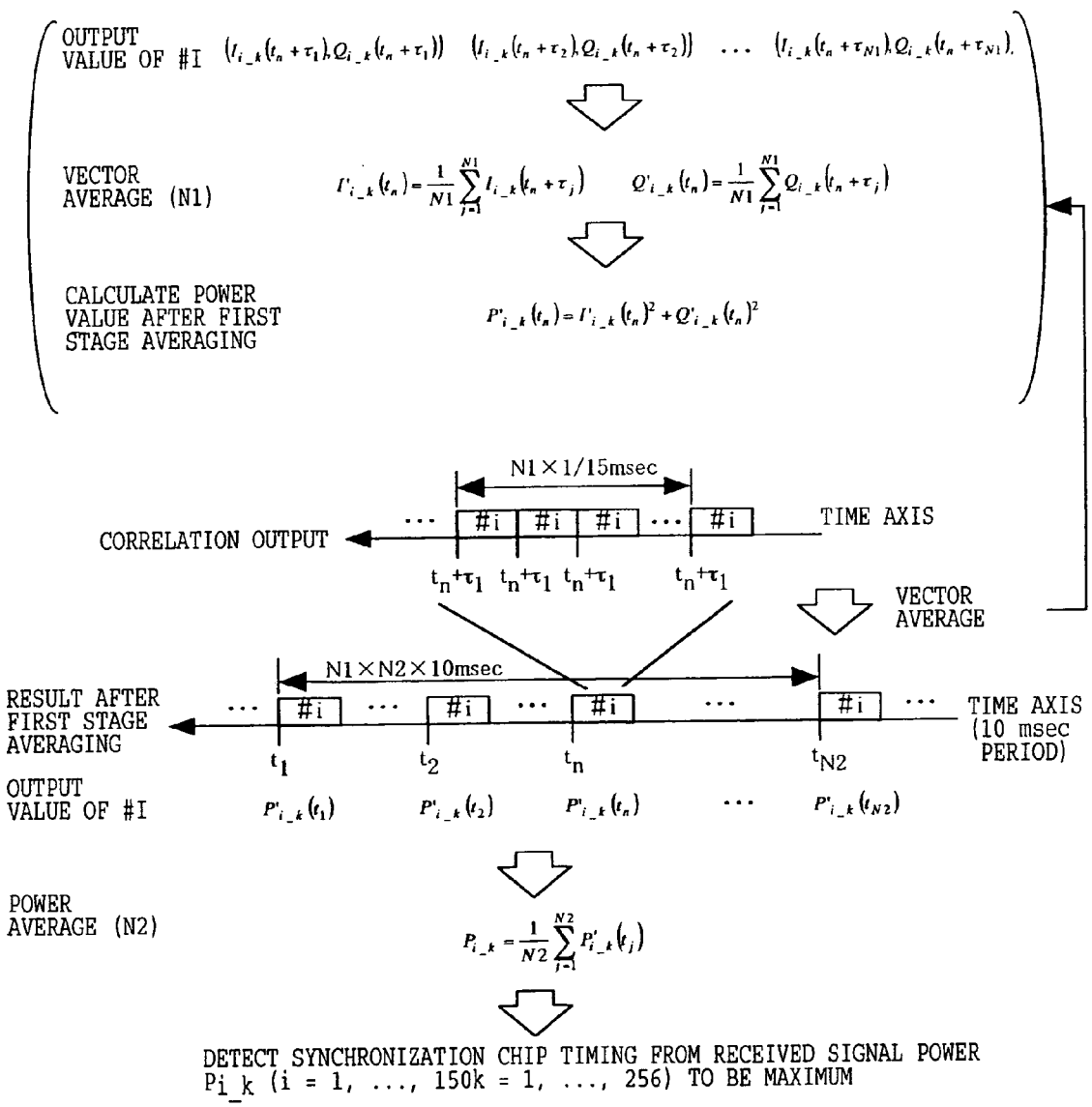
FIG. 13 is an illustration showing a principle of operation of the third embodiment of a synchronization detecting method according to the present invention.

FIG. 13 shows a principle of operation of the third embodiment of the synchronization detection method according to the present invention. The third embodiment of the synchronization detection method is further improvement of the second embodiment set forth above. Namely, process of equalizing process can be set for a plurality of times. Even in each process, using the average value obtained by averaging for a plurality of times by the same or different averaging method, the synchronization chip timing of the channel to be measures is determined.

In the third embodiment, averaging operation is repeated twice. At the first stage of averaging, N1 in number of vector averaging process is performed per synchronization timing candidate. Subsequently, the power value is derived from the received signal vector after vector averaging for deriving N2 in number of averaged values. At the second stage, the chip timing where the received signal power after averaging becomes maximum, is detected to the synchronization chip timing of the channel to be measured.

In the third embodiment, at first, in the first stage averaging, the average value of the received signal power in the synchronization chip timing other than the true synchronization chip timing becomes small for N1 in number of samples. Subsequently, by averaging in the second stage, the standard deviation becomes smaller than N2 in number of samples. As a result, probability of success in detection of synchronization becomes further higher in comparison with the case of one time of averaging operation. In the third embodiment, a period required for synchronization detection is (N1×N2×10) msec.

Figure 14:
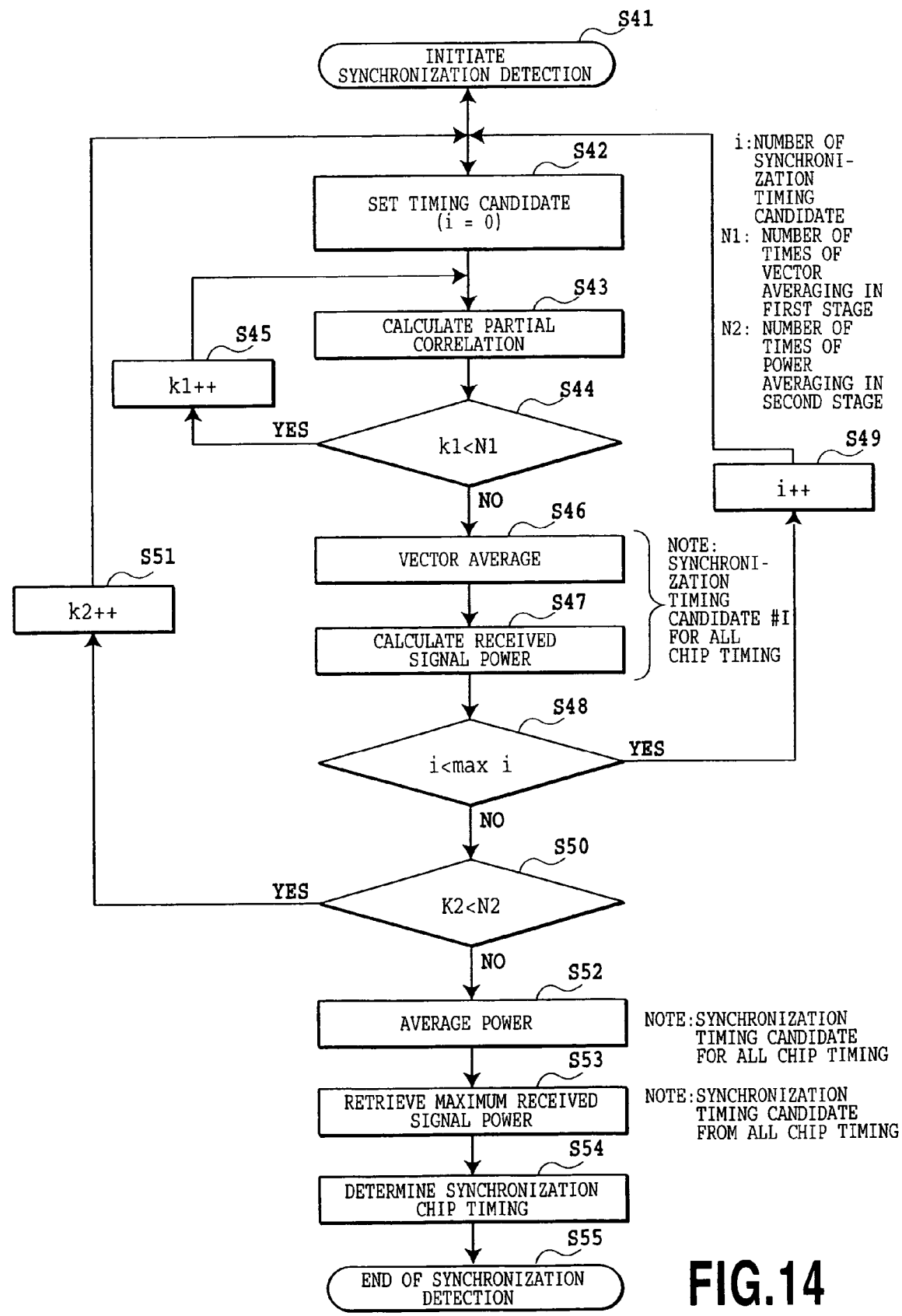
FIG. 14 is a flowchart showing a synchronization chip timing detection procedure in the third embodiment of the synchronization detecting method.

FIG. 14 shows a synchronization chip timing detection procedure in the third embodiment of synchronization detection method. At step S41, synchronization detection is initiated. At step S42, synchronization timing candidate is set (i=0). At step S43, partial correlation calculation is performed. At step S44, check is performed whether k1<N1 is satisfied or not. At step S45, k1 is incremented. At step S46, vector average is derived for all chip timing of synchronization timing candidate #i. At step S47, the power values are calculated for all chip timing of the synchronization timing candidate #i. At step S48, check is performed whether i<max i is satisfied or not. At step S49, i is incremented. At step S50, check is performed whether k2<N2 is satisfied or not. At step S51, k2 is incremented. At step S52, power averaging is performed at all synchronization timing candidate or all chip timing. At step S53, retrieval of the maximum power of the received signal is performed for all synchronization timing candidate or all chip timing. At step S54, the synchronization chip timing is determined. At step S55, synchronization detection is terminated.

Furthermore, the fourth embodiment of the synchronization detection method will be explained. The fourth embodiment determines the synchronization chip timing of the channel to be measured by performing synchronization chip timing detection process in the foregoing first to third embodiments for a plurality of times and using the averaged value of a plurality of synchronization chip timing values and the standard deviation value. Therefore, in the fourth embodiment, check is performed whether the detected synchronization chip timing is reasonable or not.

FIG. 15 shows a principle of operation of the fourth embodiment of the synchronization detection method according to the present invention. M in number of synchronization chip timings detected after averaging are prepared. Then, the synchronization chip timing as object for measurement is checked. It should be noted that, in the fourth embodiment, complete synchronization detection is not required and it is only required to have a value falling within certain range (measurement window).

The fourth embodiment is premised in that measurement of all chip timing in measurement window is performed after synchronization detection. At first, an averaged value of M in number of detected synchronization chip timings. Subsequently, using the average value thus derived, the standard deviation is derived. As an averaged value derived centered at the measurement window, the value of the derived standard deviation falls within the measurement window width, measurement becomes possible to take the detection successful. On the other hand, when the derived standard deviation does not fall within the measurement window, judgment is made that probability of failure of detection is high to again initiate synchronization detection.

Next, explanation will be given for the synchronization detection method in the case where transmit diversity is applied in CPICH.

Figure 16:
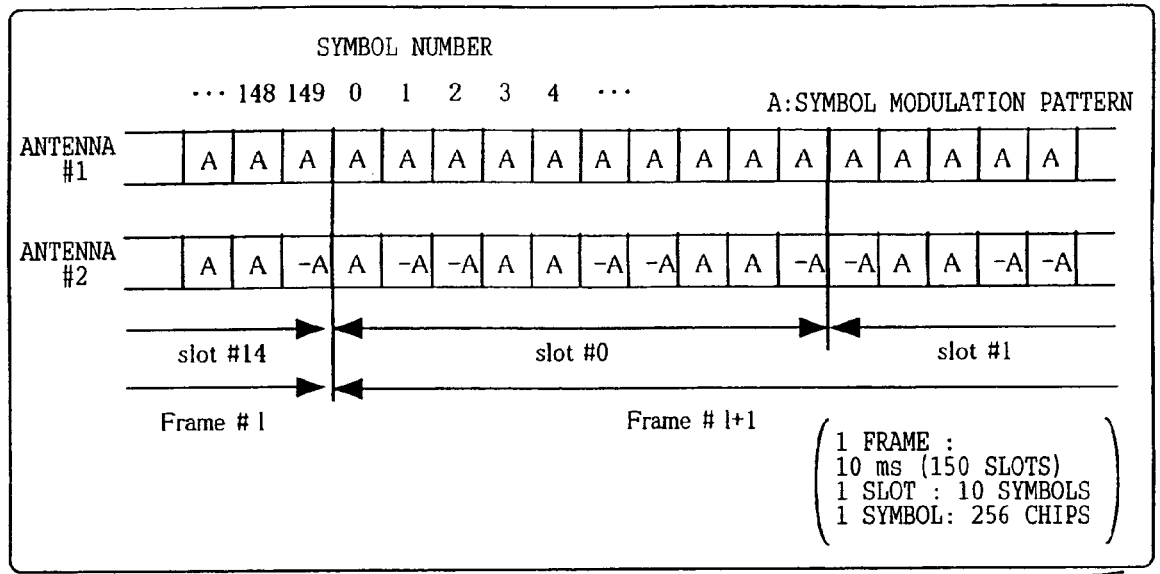
FIG. 16 is an illustration showing a frame structure of CPICH and the received signal in the case where a transmit diversity is applied.

FIG. 16 shows the frame structure of CPICH and the received signal in the case where the transmit diversity is applied. α1 is a vector variation amount depending upon propagation path from the transmission antenna #1 of the base station to the mobile station, α2 is a vector variation amount depending upon propagation path from the transmission antenna #2 of the base station to the mobile station. These are varied from time to time according to movement of place of the mobile station. On the other hand, the signal transmitted from each antenna of the base station is provided modulation of A or −A per symbol. This pattern is determined uniquely. It should be noted that symbol modulation pattern when the transmit diversity is not applied, is the same as that of the antenna #1.

CPICH transmitted from the antenna #1 and the antenna #2 are influenced by each propagation path. In the mobile station, the signals in combined form are received. Accordingly, the signal of symbol #0 transmitted from the base station is received in the mobile receiving station as expressed by the following equation:

$$R(0)=\sqrt{P_{t1}}\alpha_1(0)\cdot A+\sqrt{P_{t2}}\alpha(0_2)\cdot A+N(0) \quad (1)$$

wherein R(0) is the received signal vector after correlation detection, $P_{t1}$ and $P_{t2}$ are transmitting power of CPICH in respective transmission antennas, N(0) is interference signal vector.

The synchronization detection is detection of the position of symbol #0 in the mobile receiving station. It should be noted that communication quality measurement upon use of transmit diversity which will be discussed later, is derivation of the desired signal power as expressed by:

$$<P_{t1}|\alpha_1|^2+P_{t2}|\alpha_2|^2> \quad (2)$$

and the interference power as expressed by:

$$<|N|^2> \quad (3)$$

wherein < > expresses an average.

Next, the received signal vector combined as expressed by the foregoing expression (1) will be separated into the received signal vector from each transmission antenna. For separation, two continuous symbols are used. Assuming (i)th symbol (wherein i is even number) as a symbol to be a reference, the received signal vector $r_1$ and $r_2$ from each antenna is expressed by:

$$r_1(i) = \frac{R(i+1)+R(i)}{2A} \quad (4)$$
$$\approx \sqrt{P_{t1}}\,\alpha_1(i) + \frac{N(i+1)+N(i)}{2A}$$
$$r_2(i) = (-1)^{i/2+1}\frac{R(i+1)-R(i)}{2A}$$
$$\approx \sqrt{P_{t2}}\,\alpha_2(i) + (-1)^{i/2+1}\frac{N(i+1)-N(i)}{2A}$$

The foregoing equation (4) use approximations of $\alpha_1(i+1)\cong\alpha_1(i)$ and $\alpha_2(i+1)\cong\alpha_2(i)$.

Figure 17:
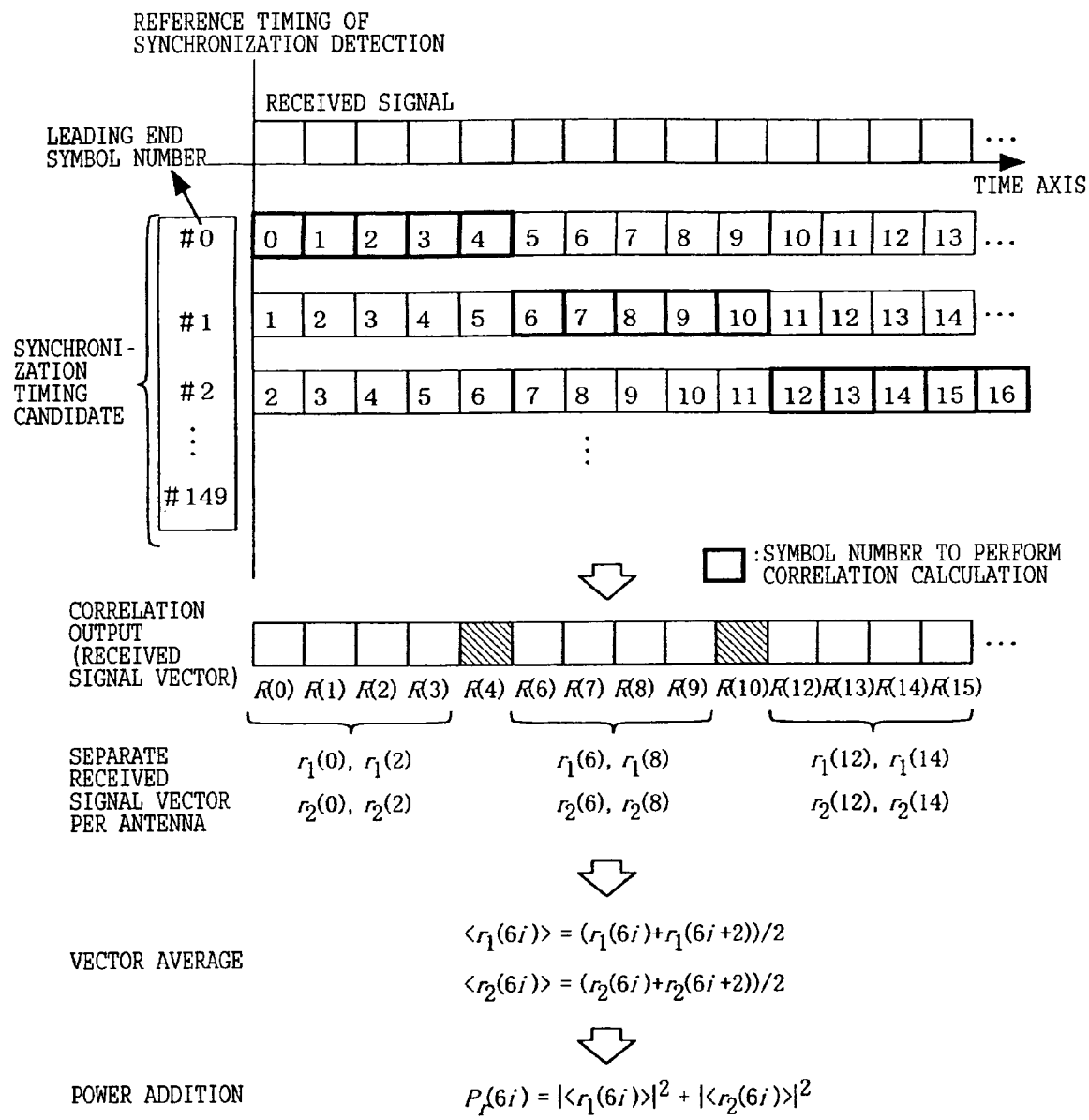
FIG. 17 is an illustration showing a principle of operation of the fifth embodiment of a synchronization detecting method according to the present invention.

FIG. 17 shows a principle of operation of the fourth embodiment of the synchronization detection method according to the present invention. The synchronization detection detects leading position (synchronization chip timing) of CPICH from the received signal. #0 to #149 in FIG. 17 are synchronization timing candidates generated by the synchronization timing candidate generating portion 2210 shown in FIG. 2. It should be noted that unit for blocking is one symbol. Calculation of correlation with the received signal is performed by sequentially extracting objective symbol number among the synchronization timing candidates #0 to #149 and using spreading code (256 chip length) corresponding to the symbol number.

For example, assuming an average number of vector is N1, from the synchronization timing candidate #i, 2N$_1$+1 in number of symbols in series from 2(N$_1$+1)i is selected for correlation calculation. When matched filter is used in correlation calculation, a timing to finish correlation calculation for all of the synchronization timing candidates is T1=10×(2N$_1$+1)[ms].

Next, from the obtained received signal vector R(i) and R(i+1), the received signal vector from each transmission antenna is separated using the foregoing equation (4). Here, number of received signal vectors after separation belonging in the same synchronization timing candidates is N$_1$ in number per one transmission antenna. These N$_1$ in number of received signal vectors averaged per transmission antenna, and finally, obtained two average vectors are summed in power. FIG. 17 shows the case where the number of vector average N$_1$ is 2. In practice, the foregoing calculation is performed for all of 256 chips. On the other hand, the foregoing calculation is executed with over-sampling of X times of one symbol, calculation is performed for number of samples of 256×X. The synchronization chip timing is determined by synchronization timing candidate having the maximum power value and the chip number in the symbol.

Figure 18:
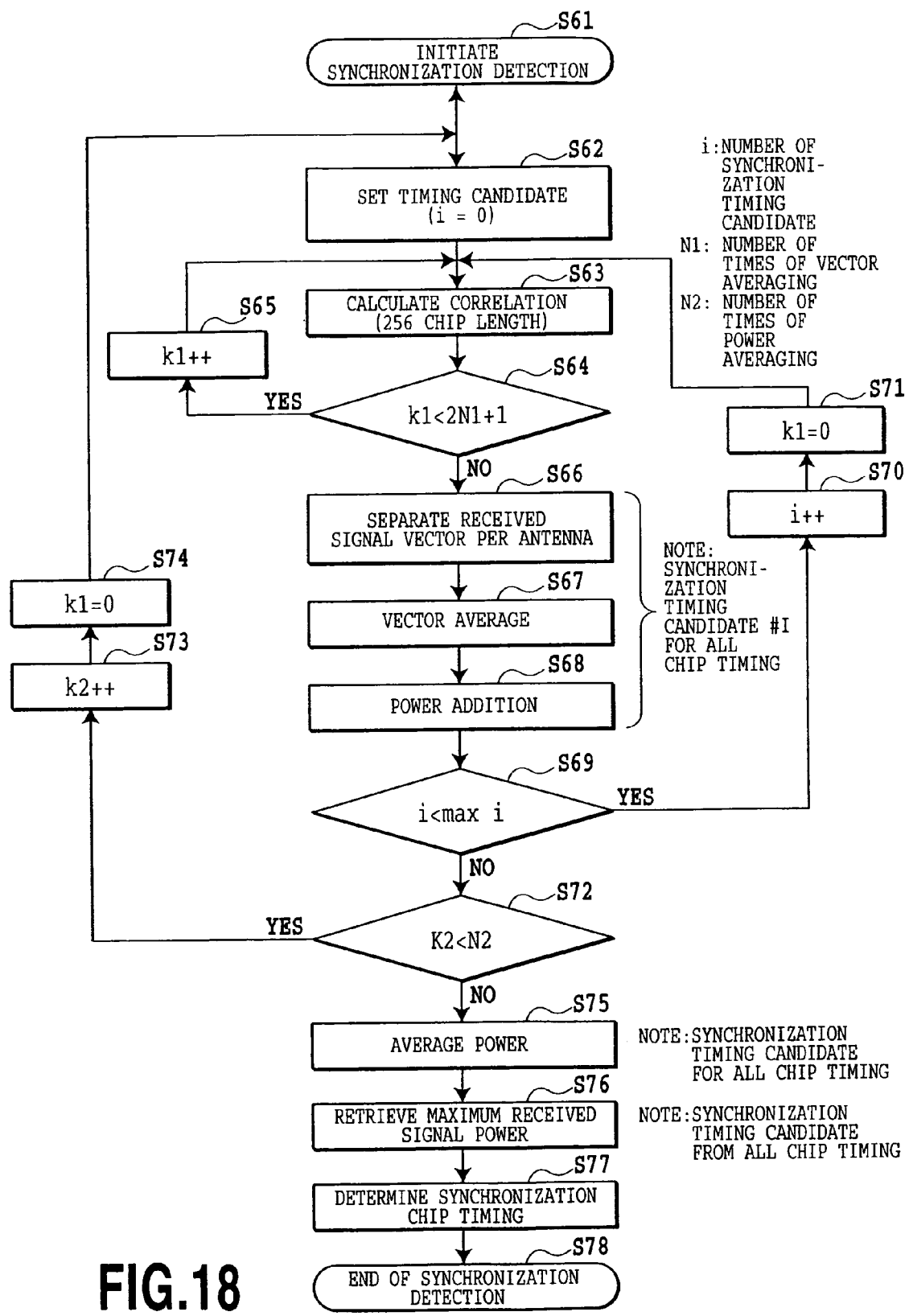
FIG. 18 is a flowchart showing a synchronization chip timing detection procedure in the sixth embodiment of the synchronization detecting method.

FIG. 18 shows the synchronization chip timing detection procedure in the sixth embodiment of the synchronization detection method. In the shown embodiment, except for the period required for calculation, a period from initiation of synchronization detection to finishing thereof is T$_1$=10× (2N$_1$+1)×N$_2$[ms].

At step S61, synchronization detection is initiated. At step S62, synchronization timing candidate is set (i=0). At step S63, partial correlation calculation is performed. At step S64, check is performed whether k1<2N1+1 is satisfied or not. At step S65, k1 is incremented. At step S66, received signal vector is separated per antenna with respect to all chip timings of the synchronization timing candidates. At step S67, vector averages of the received signal vectors are derived. At step S68, the averaged received signal vector is converted into the power value per antenna and then the power values of respective antennas are summed.

At step S69, check is performed whether i<max i is satisfied or not. At step S70, i is incremented. At step S71, k1 is reset to 0. At step S72, check is performed whether k2<N2 is satisfied or not. At step S73, k2 is incremented. At step S74, k1 is reset to 0. At step S75, power averaging is performed at all synchronization timing candidates or all chip timing. At step S76, retrieval of the maximum power of the received signal is performed for all synchronization timing candidates or all chip timing. At step S77, the synchronization chip timing is determined. At step S78, synchronization detection is terminated.

(2) Communication Quality Measuring Method

Figure 19:
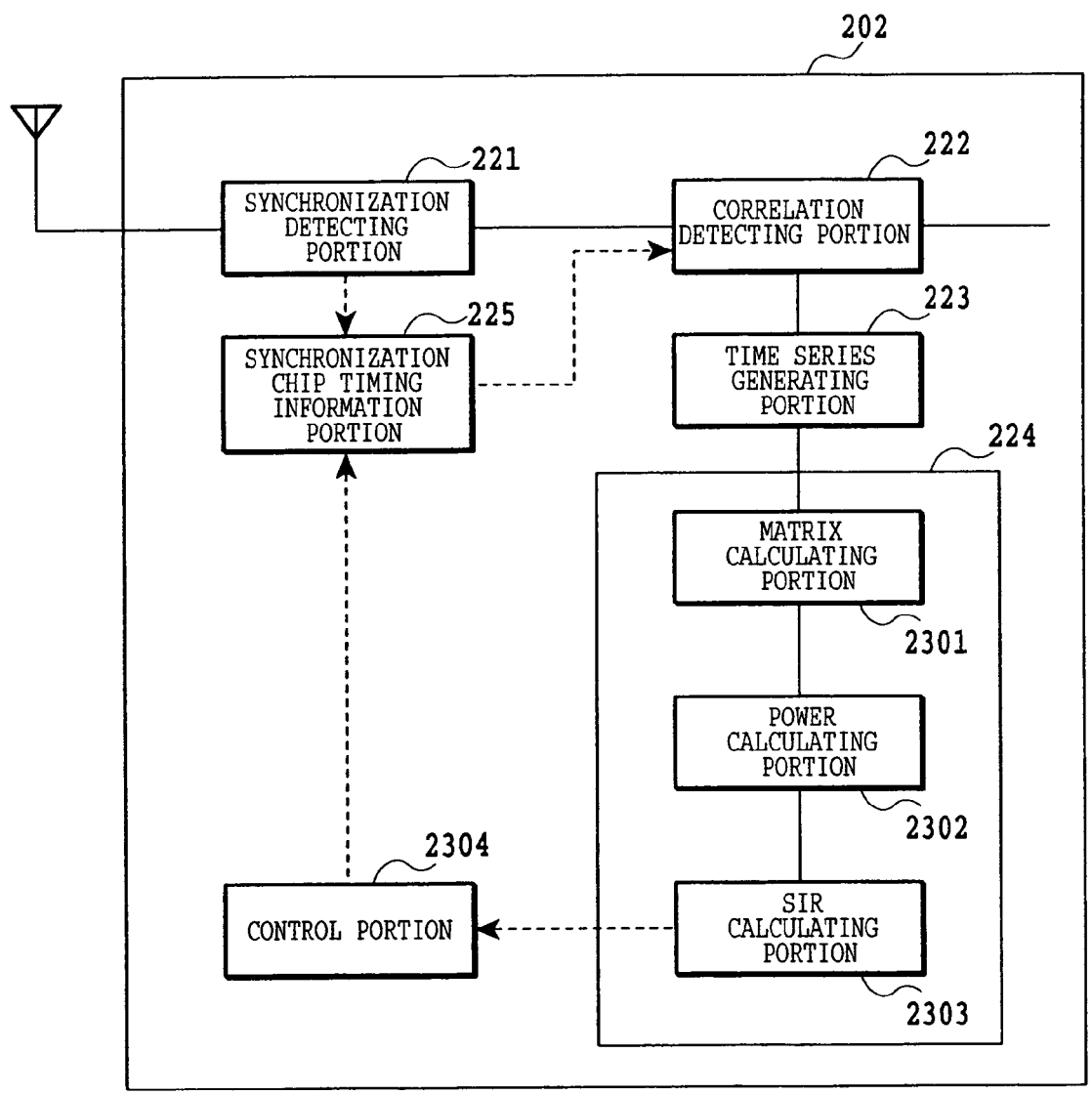
FIG. 19 is a block diagram showing an overall construction of the mobile station, to which the present invention is applied.

Next, the measurement method of communication quality will be explained. FIG. 19 shows overall construction of the mobile station, to which the present invention is applied. The mobile station 202 has the same construction as that of FIG. 2. The communication quality calculating portion 224 includes matrix calculation means 2301 for deriving covariant matrix from two time series data in the received signal vector generated in the time series generating portion 223 and performing calculation of eigenvalues, power calculating means 2302 for calculating the desired signal power and the interference signal value using the eigenvalues, and SIR calculating means for deriving SIR.

On the other hand, using a control portion 2304 as component of the mobile communication system, a path between transmitter and receiver effective for communication is derived using the SIR value derived in the SIR calculation means to control the synchronization chip timing information portion 225 for achieving measurement of more precise value.

In the shown embodiment, with reference to the synchronization chip timing obtained in the synchronization detecting portion, all chip timings in a certain range are taken as object for measurement. Namely, communication quality measurement using the measurement window is performed.

Figure 20:
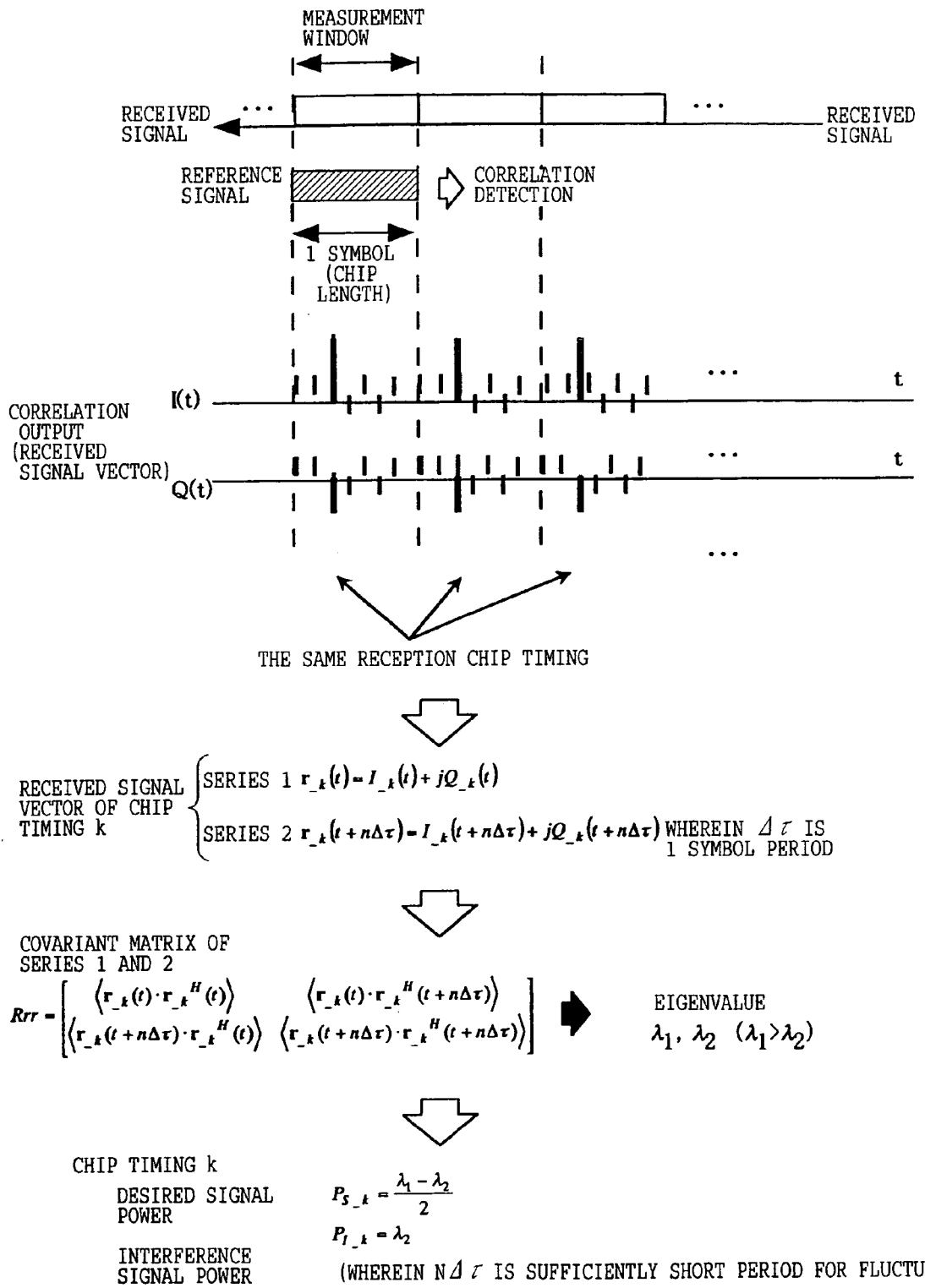
FIG. 20 is an illustration showing a principle of operation of the first embodiment of a communication quality measuring method according to the present invention.

FIG. 20 shows a principle of operation of the first embodiment of the communication quality measuring method according to the present invention, a chip length to perform correlation detection and the measurement window width is taken as one symbol. Here, consideration is given for chip timing k presenting in the measurement window. In order to derive the desired signal power and the interference signal power in the chip timing k, a series 1 is established by arranging the received signal vector of the chip timing 1 in a certain given period (averaged period, and a series 2 is established by a time series data of the received signal vector distanced from the series 2 for several symbols.

Next, covariant matrix of the series 1 and the series 2 is derived to calculate eigenvalues thereof. By performing operation shown in FIG. 20 using the eigenvalues thus derived, the desired signal power and the interference signal power at the chip timing k can be derived as averaged values within the averaging period. It should be noted that the operation for deriving the powers from the eigenvalues shown in FIG. 20 is effective only when correlation between two series is relatively high. In other words, the foregoing operation is only effective when the time difference between two series is sufficiently small relative to a variation of the desired signal vector due to multi-path fading. In the shown embodiment, there is no limitation in sampling interval (data interval in one series) and number of samples (number of data in one series).

It should be noted that greater number of samples within the averaging period results is closer value to the true value. On the other hand, SIR in the chip timing k can be derived from a ratio of the obtained desired signal power and the interference signal power. On the other hand, in case of communication quality measurement not using the measurement window, the synchronization chip timing obtained by the synchronization detecting portion may be measured as the chip timing k.

Figure 21:
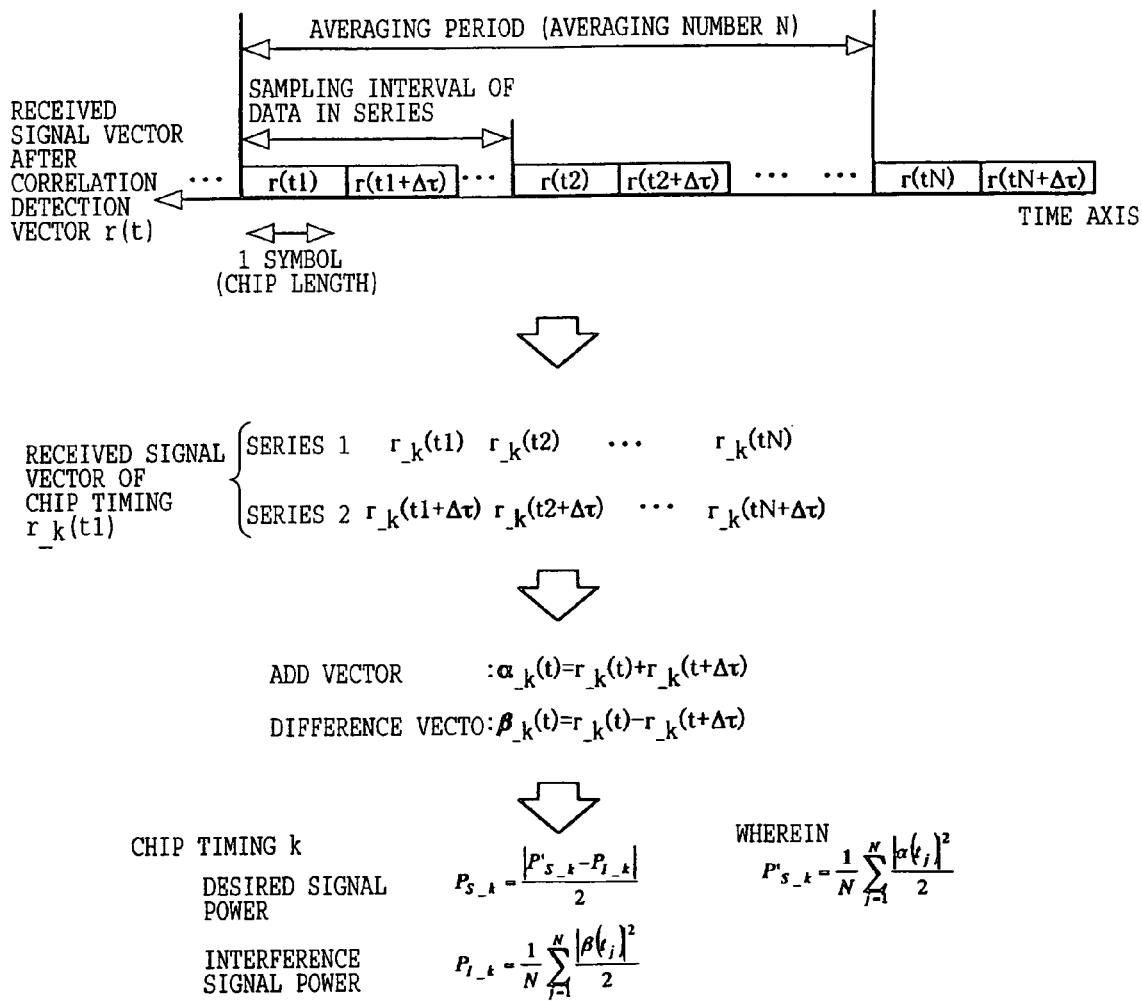
FIG. 21 is an illustration showing a principle of operation of the second embodiment of a communication quality measuring method according to the present invention.

FIG. 21 shows a principle of operation of the second embodiment of the communication quality measurement method according to the present invention. When correlation between two series, namely when the correlation value is greater than or equal to 0.85, the desired signal power and the interference signal power can be derived from an add vector and difference vector relative to the received signal vectors having reception timing close to each other between time series. More preferably, at the correlation value greater than or equal to 0.9, the desired signal power and the interference signal value are derived at comparable precision as the first embodiment of FIG. 20. Further preferably, at the correlation value greater than or equal to 0.95, the desired signal power and the interference signal value are derived at comparable precision as the first embodiment of FIG. 20 and with more simple calculation method.

In the shown embodiment, a time difference between time series (delay time difference) as one symbol, the add vector and difference vector are derived from the received signal vector between adjacent symbols. At first, using N in number of difference vector within the averaging period, the interference signal power is derived by operation shown in FIG. 21. Next, the desired signal power is derived using N in number of add vectors within the averaging period and already derived interference signal power. From a ratio of the derived desired signal power and the interference signal power, SIR in the averaging period can be derived. Even in the shown embodiment, similarly to the first embodiment shown in FIG. 20, there is basically no limitation for the sampling interval and the sampling number.

In the shown embodiment, in the time series generating portion 223 shown in FIG. 19, in addition to generation of two time series data of the received signal vector, generation of time series data of the add vector and difference vector is also performed. It should be noted that, in the shown embodiment, since the eigenvalues are not required, matrix operation shown in FIG. 19 becomes unnecessary.

Figure 22:
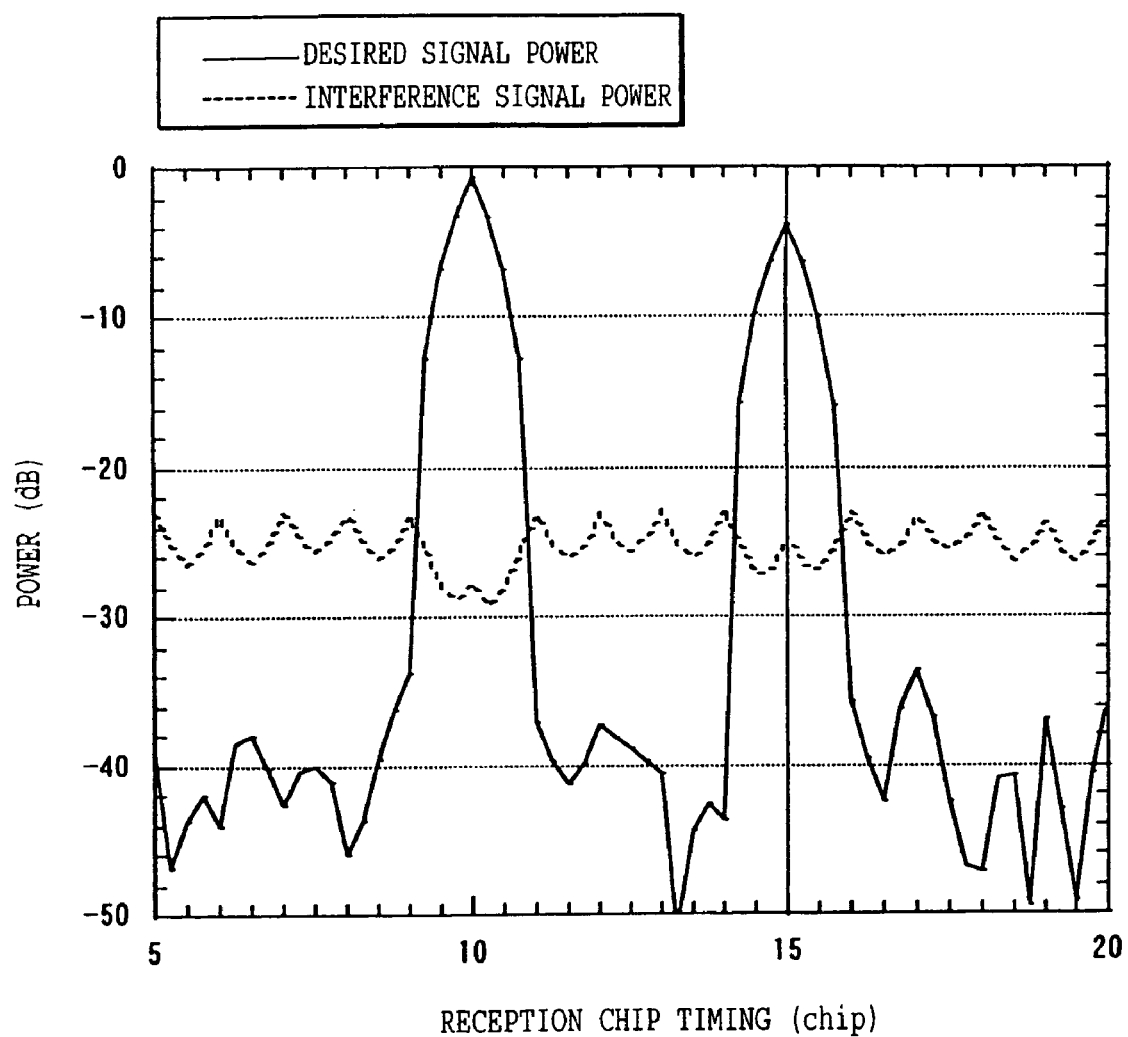
FIG. 22 is an illustration showing a result of simulation in the second embodiment of the communication quality measuring method.

FIG. 22 shows a result of simulation in the second embodiment of the communication quality measuring method. Namely, FIG. 22 shows examples of the result of output of the desired signal power and the interference signal within the measurement window derived by simulation. In the simulation, it is assumed that two signals, in which a certain code is spread, arrive with 5 chip delay. Namely, the position of the first path is tenth chip and the position of the second path is fifteenth chip. The signal arriving at the second path acts as interference signal in the first path and the signal arriving at the first path acts as interference signal in the second path. The averaging period is 1500 symbols and the sampling interval is 1 symbol. It should be noted that the power of the signal arriving at the second path is set to be 5 dB lower than the power of the signal arriving at the first path. The correlation detection is perform with four times over-sampling of 256 chip length.

Figure 23:
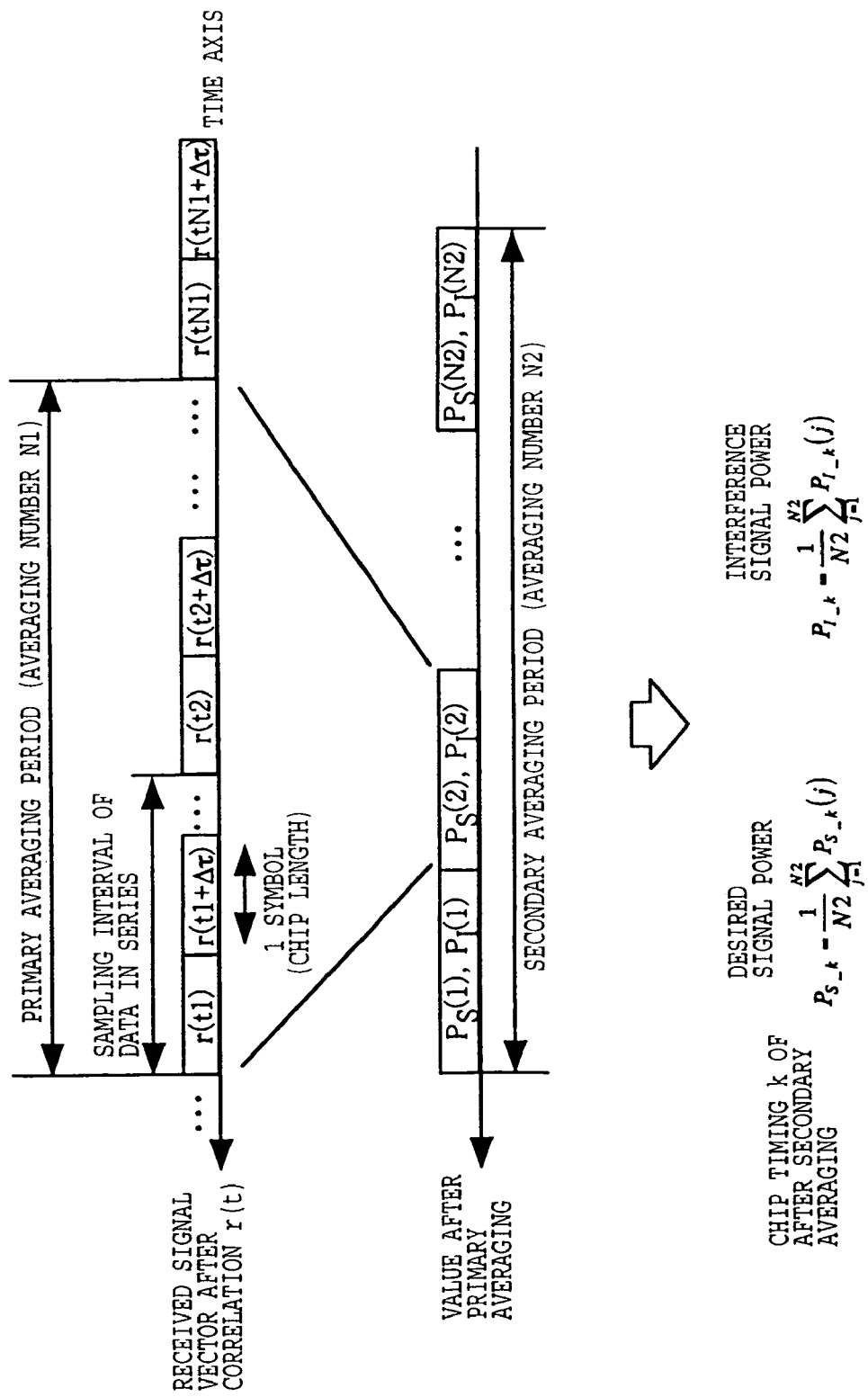
FIG. 23 is an illustration showing a principle of operation of the third embodiment of a communication quality measuring method according to the present invention.

FIG. 23 shows a principle of operation of the third embodiment of the communication quality measuring method according to the present invention. In the shown embodiment, by averaging the desired signal power and the interference signal power derived in the foregoing first and second embodiments, more stable value (average value) can be obtained. In the shown embodiment, at first, an average values of the desired signal power and the interference signal power are derived per N1 in number of chips in the average period using the methods in the first and second embodiments (primary averaging). Then, as secondary averaging, N2 in number of desired signal powers and the interference signal powers obtained by the primary averaging are averaged in power. It should be noted that SIR in the averaging period is derived from a ratio of the derived desired signal power and the interference signal power.

Figure 24:
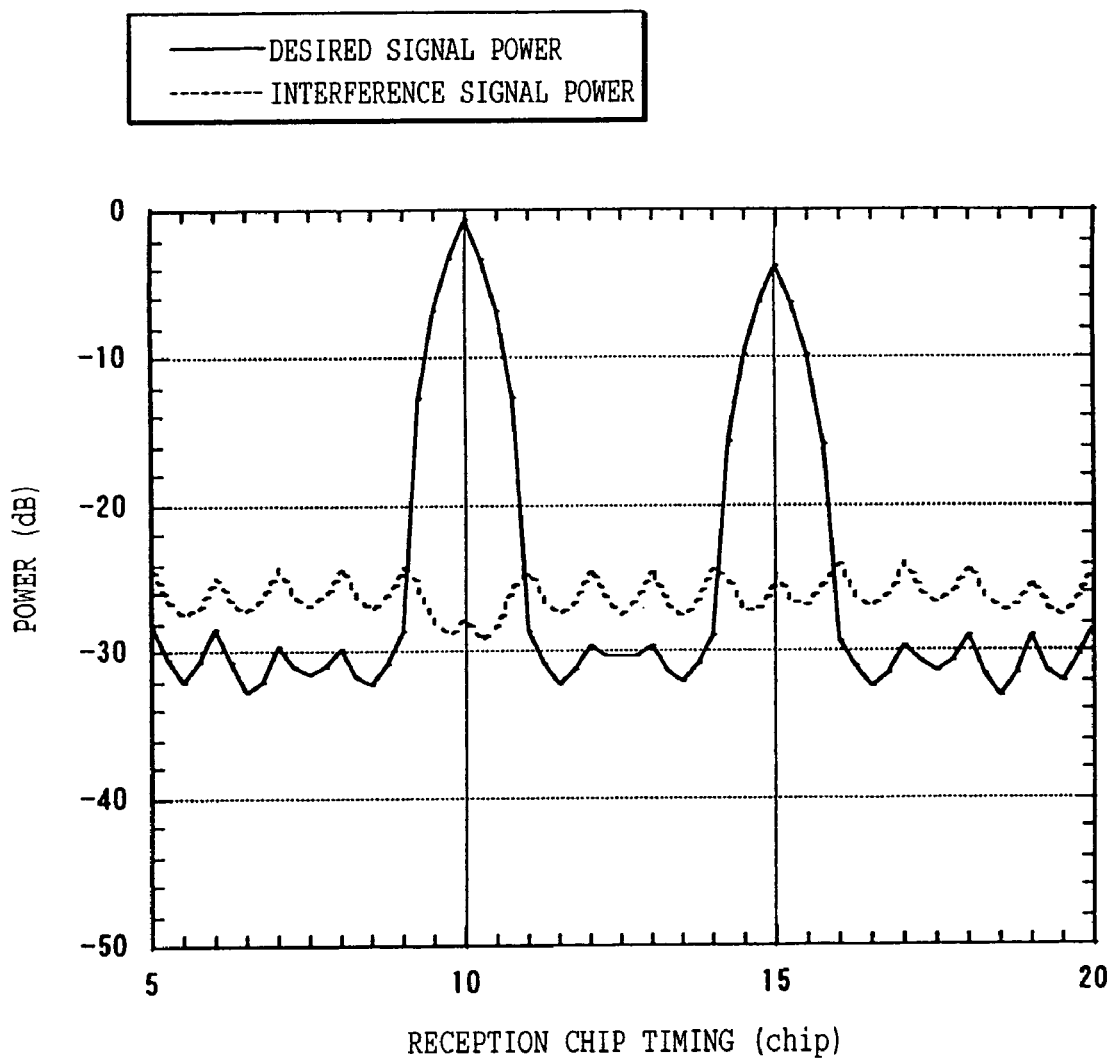
FIG. 24 is an illustration showing a result of simulation in the third embodiment of the communication quality measuring method.

FIG. 24 shows a result of simulation by the third embodiment of the communication quality measuring method. Condition of simulation is the same as those of FIG. 22 except for averaging method. Averaging sample number is 5 in the primary averaging and 300 in the second averaging. The averaging period in total is 1500 symbols. Comparing with the results shown in FIG. 22, it should be appreciated that more stable values can be obtained.

Figure 25:
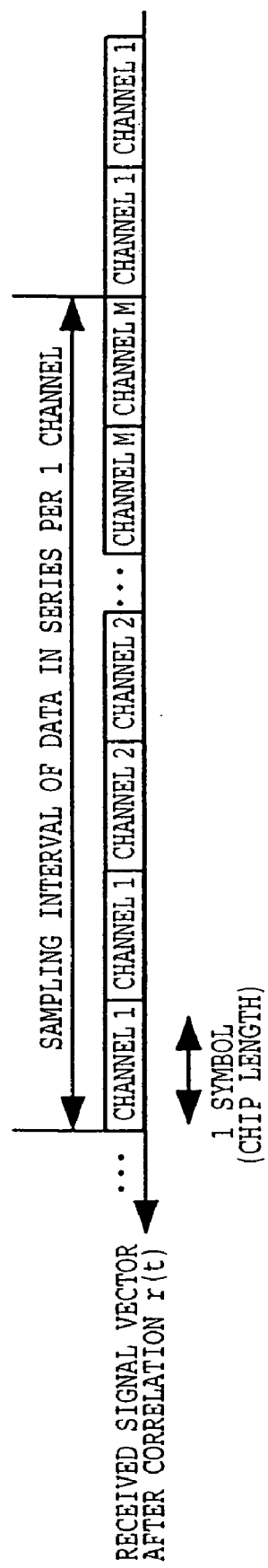
FIG. 25 is an illustration showing a principle of operation of the fourth embodiment of a communication quality measuring method according to the present invention.

FIG. 25 shows a principle of operation of the fourth embodiment of the communication quality measuring method according to the present invention. In the shown embodiment, number of channels to be measured is assumed to be M. The reason why the same channels are continuous for two symbols, is that two series data are required by the averaging methods in the first and second embodiments. As shown in FIG. 25, with taking two symbols as set, measurement of other channel within the sampling period becomes possible. In a certain given period, measurement data of a plurality of channels can be obtained at substantially the same. In the prior art using the vector averaging, since there is a limitation that "phase variation of the desired signal vector due to multi-path fading in the averaging period, should be ignorable." Therefore, when number of channels to be measured is large number and the averaging period is relatively long, time multiplexing of other channel within the sample period is difficult.

Figure 26:
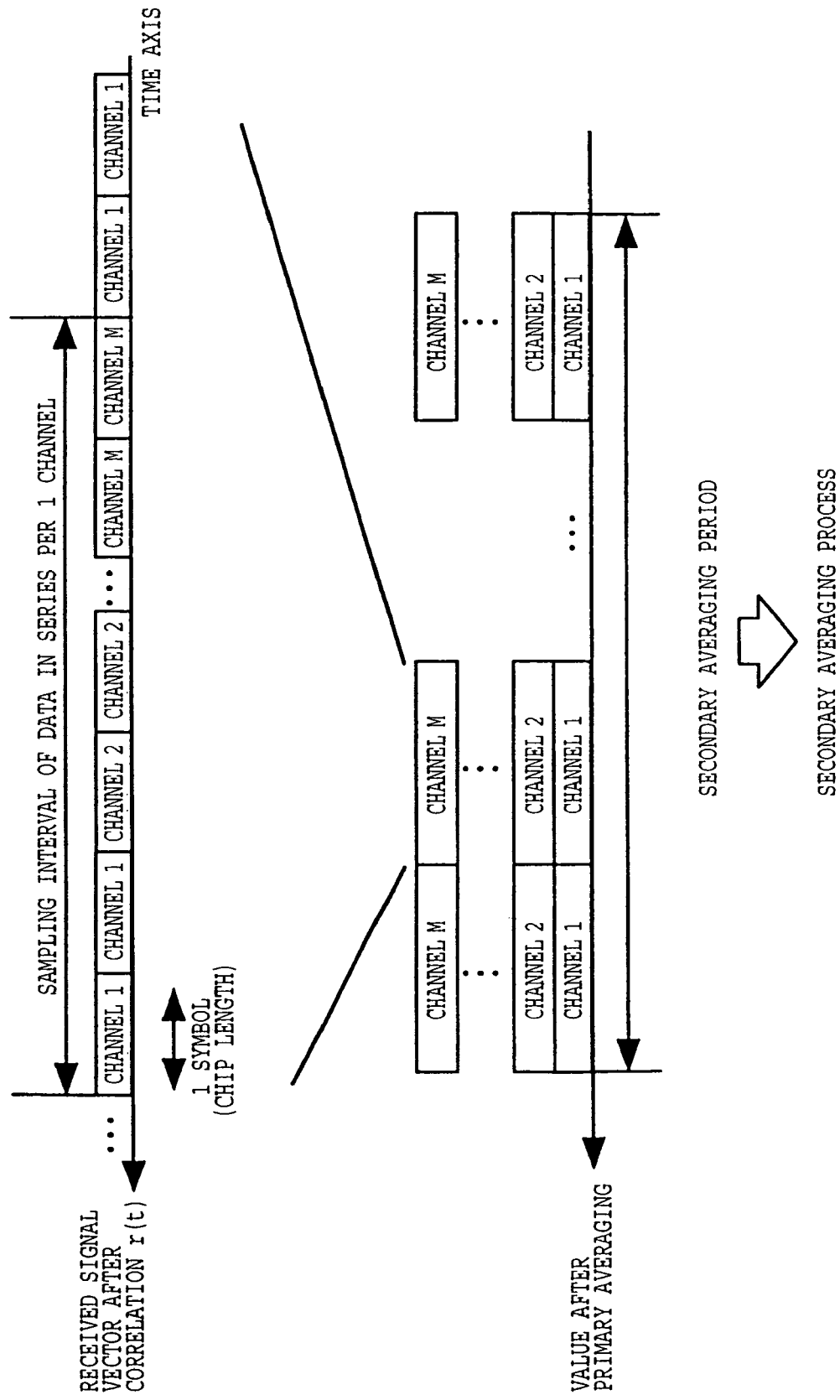
FIG. 26 is an illustration showing a principle of operation of the fifth embodiment of a communication quality measuring method according to the present invention.

FIG. 26 shows a principle of operation of the fifth embodiment of the communication quality measuring method according to the present invention. In the shown embodiment, primary average is derived by time multiplexing of other channels within sampling period of one channel. Then, secondary averaging (averaging in power) is performed from the result obtained by the primary averaging.

Figure 27:
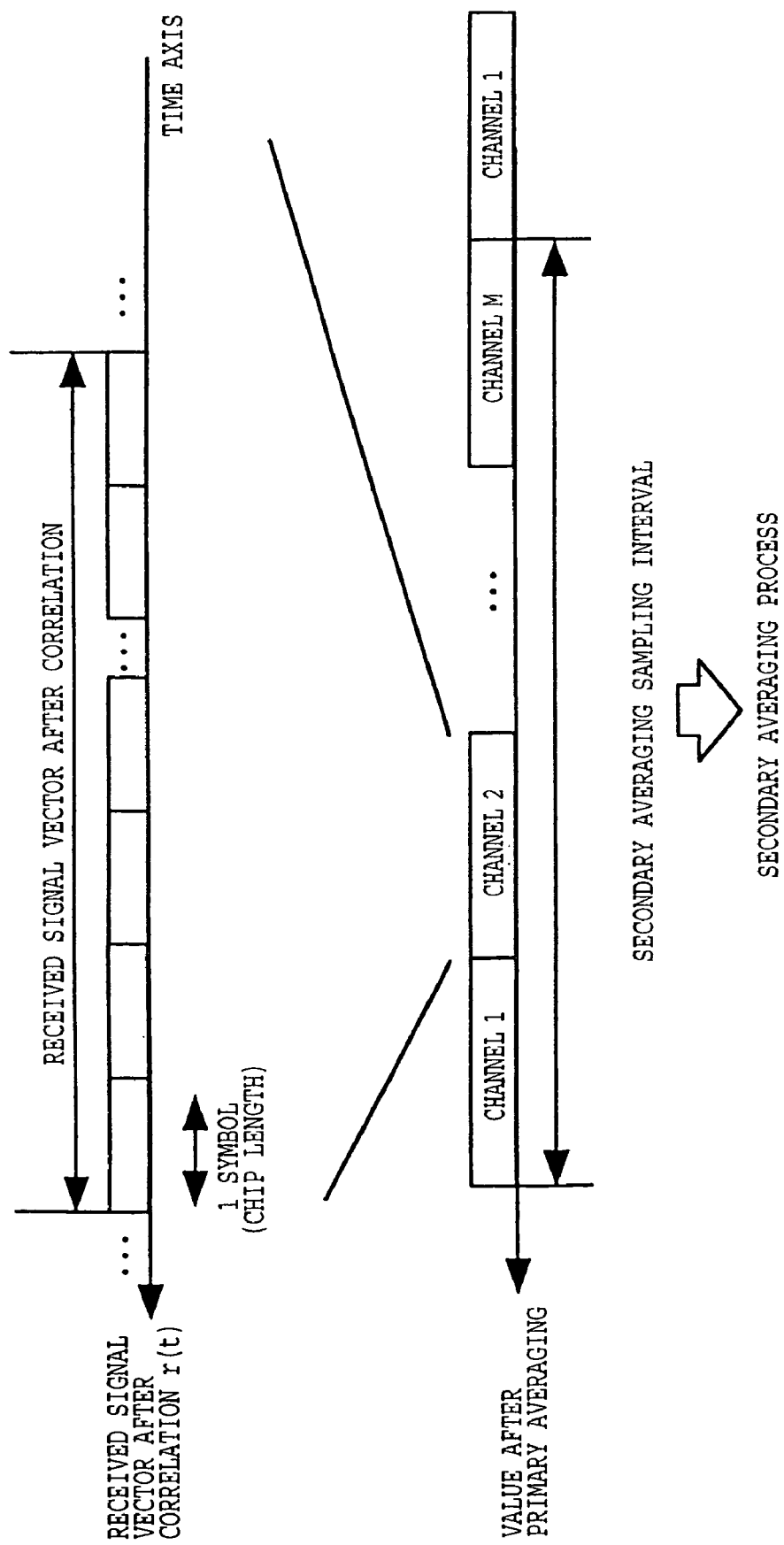
FIG. 27 is an illustration showing a principle of operation of the sixth embodiment of a communication quality measuring method according to the present invention.

FIG. 27 shows a principle of operation of the sixth embodiment of the communication quality measuring method according to the present invention. In the shown embodiment, at first, primary averaging is performed per one channel, and other channels are multiplexed in the secondary averaging period to obtain the values after secondary averaging of respective channels.

Figure 28A:
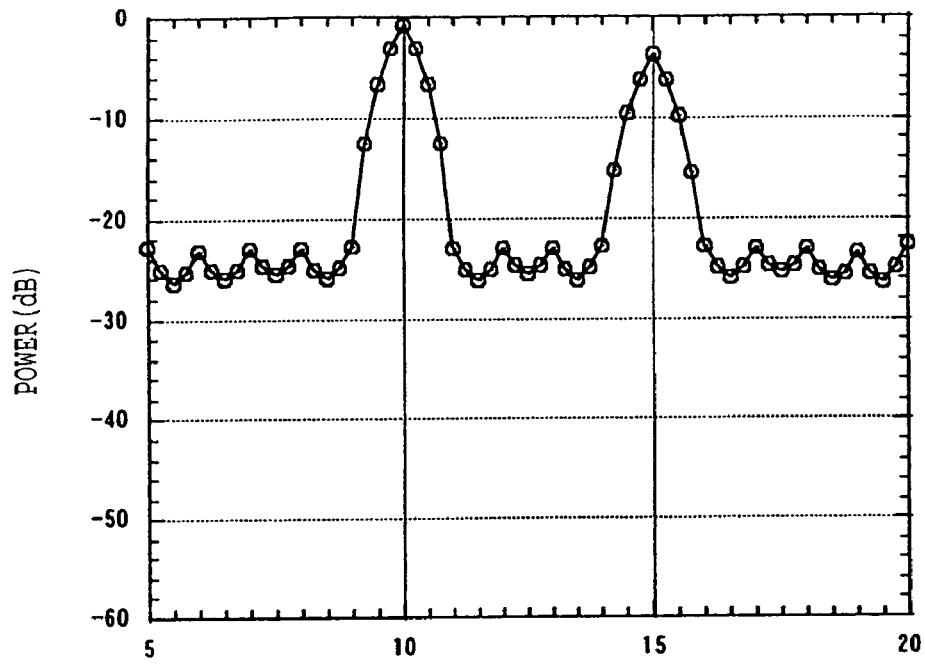
FIGS. 28A and 28B are illustrations showing a result of simulation in the fifth embodiment of the communication quality measuring method.
Figure 28B:
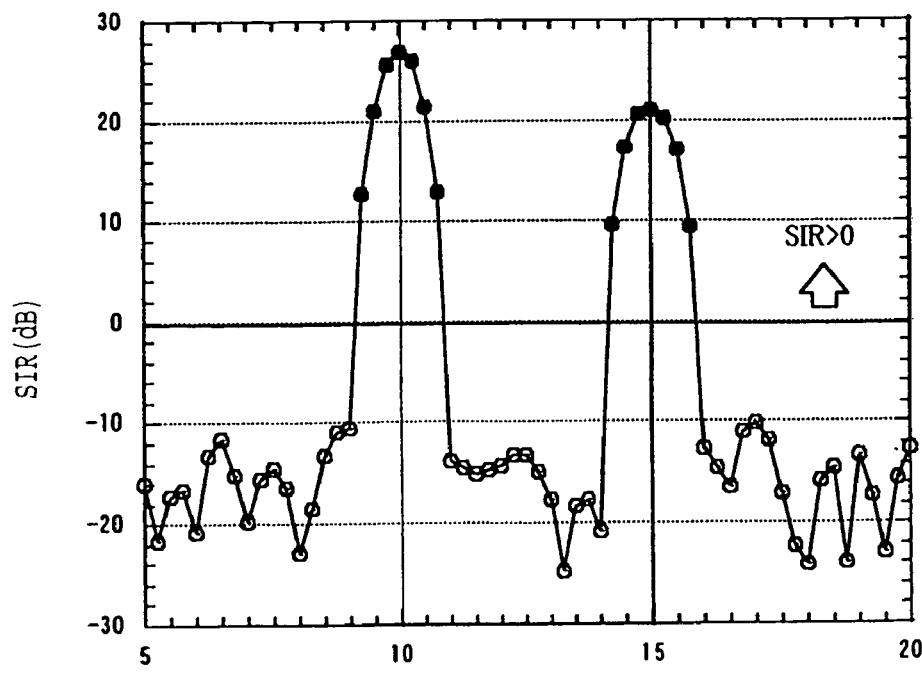

FIGS. 28A and 28B show the results of simulation in the fifth embodiment of the communication quality measuring method. FIG. 28A is a profile of obtained received signal power performing simulation in the same condition as FIGS. 22 and 24. The averaging method performs only averaging in power per chip. FIG. 28B is a profile of SIR per each chip derived using the desired signal power and the interference signal power obtained from FIG. 22. Conventionally, the position of the path to be effective in communication is detected as the synchronization chip timing from the peak where the power becomes maximum by deriving the received signal power per chip in the synchronization detecting portion 221 shown in FIG. 19, as shown in FIG. 28A.

In FIG. 28A, since the desired signal power is set relatively higher than the interference signal power, the path position can be easily detected from the peak value thereof. However, according to increase of the interference signal power, judgment whether the peak value is the actual path position or not, is difficult. On the other hand, it is not possible to distinguish whether the peak is results in presence of the path or the peak is results in fluctuation of noise only by the peak value of the power. When error is present in the synchronization chip timing in the synchronization detecting portion 221, precision in measurement is degraded since the measurement is performed at a chip timing different from the path position effective for communication, in the communication quality measuring portion 224.

On the other hand, in the shown embodiment, the synchronization chip timing obtained in the synchronization detecting portion 221 is taken as the reception chip timing to measure SIR by the first and second embodiments. In the control portion 2304 shown in FIG. 19, judgment is made whether the reception chip timing is offset from the path position effective for communication from the measured SIR value or not. If judgment is made that the reception chip timing is offset from the path position, the synchronization chip timing information portion 225 shown in FIG. 19 is controlled to modify the synchronization chip timing.

On the other hand, in case of the communication quality measurement premised by the measurement window, for all chip timing in the measurement window, the desired signal power, the interference signal power and SIR are measured. Therefore, SIR profile shown in FIG. 28B is obtained. In FIG. 28B, SIR<0 is certainly established at positions where the path is not present, and SIR>0 is established at positions where the path is present. In the control portion 2304 shown in FIG. 19, the peak value where SIR>0 is established is detected to detect the path position effective for communication.

When judgment is made that the position of the measuring window and the window width are not appropriate, modification of the position of the measuring window and the window width is performed by controlling the synchronization chip timing information portion 225 of FIG. 19. By such control, even when the path position between transmitter and receiver is moved by movement of the mobile station, the position of the window is modified following movement of the path. As a result, moving measurement of the communication quality can be realized without causing degradation of precision.

(3) Communication Quality Measuring Method Upon Use of Transmit Diversity

Figure 29:
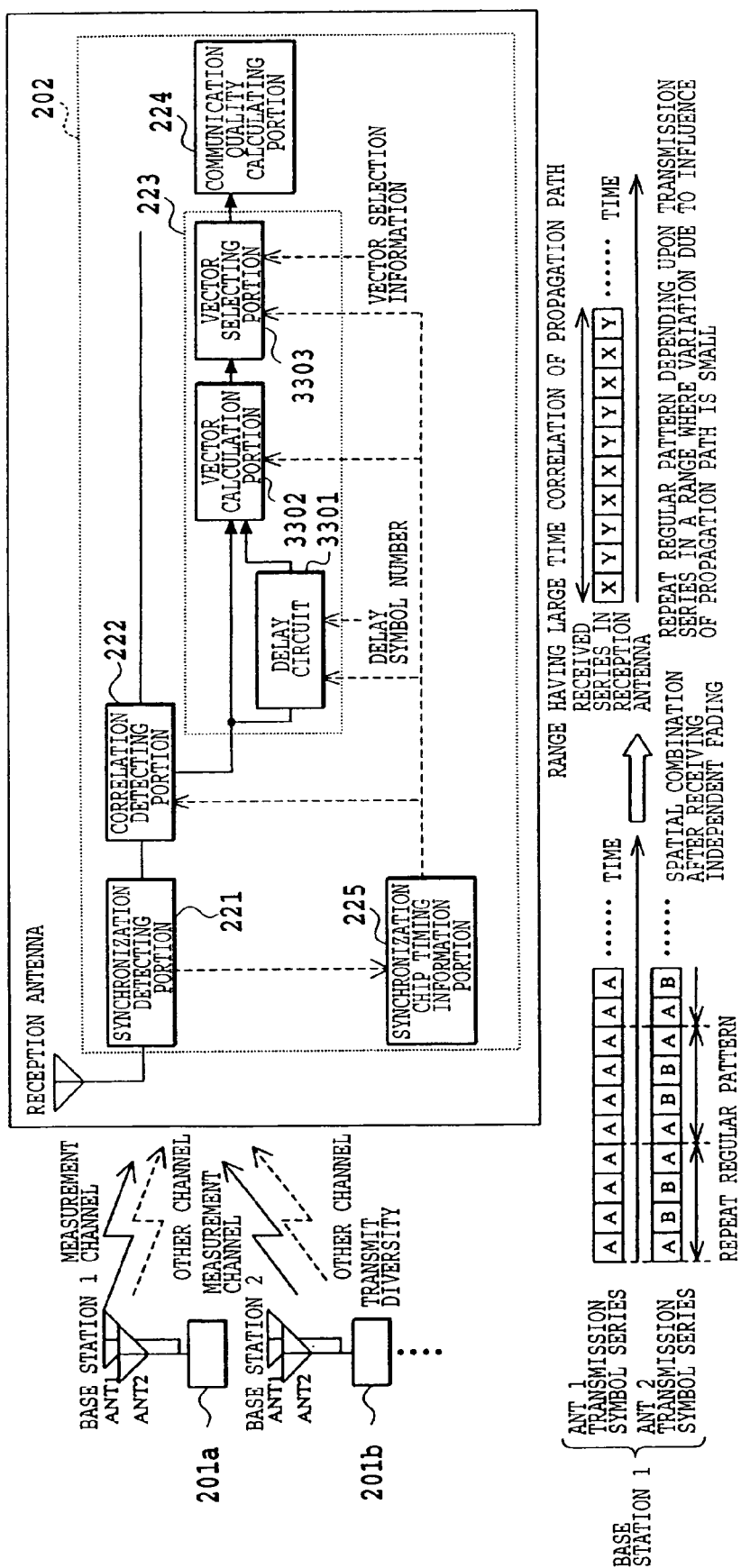
FIG. 29 is a block diagram showing an overall construction of a mobile communication system applying transmit diversity.

FIG. 29 shows overall construction of the mobile communication system applying transmit diversity. The mobile station 202 has the same construction as that shown in FIG. 2. The time series generating portion 223 is constructed with a delay circuit 3301 delaying the received signal vector after correlation detection for a predetermined delay symbol number, a vector calculation portion 3302 deriving a difference vector and add vector from difference and sum of the received signal vector, and a vector selecting portion 3303 selecting vector for performing calculation by the communication quality calculating portion 224.

When communication is performed applying transmit diversity as the channel to be measured, the channel repeatedly transmitted a known symbol series of respectively different patterns using common spreading code is assumed from two different antennas of the radio base station. When the communication applying transmit diversity is not performed, the channel repeatedly transmitted a known transmission symbol series is assumed. While two antennas of the radio base stations are located close to each other, the distance of the antennas is set to make the spatial correlation small. At receiving point in the service area, the signal reaches as a signal influenced by independent propagation path. The signals transmitted from two antennas are received by the antenna at the reception point as combined in vector in space.

Figure 30:
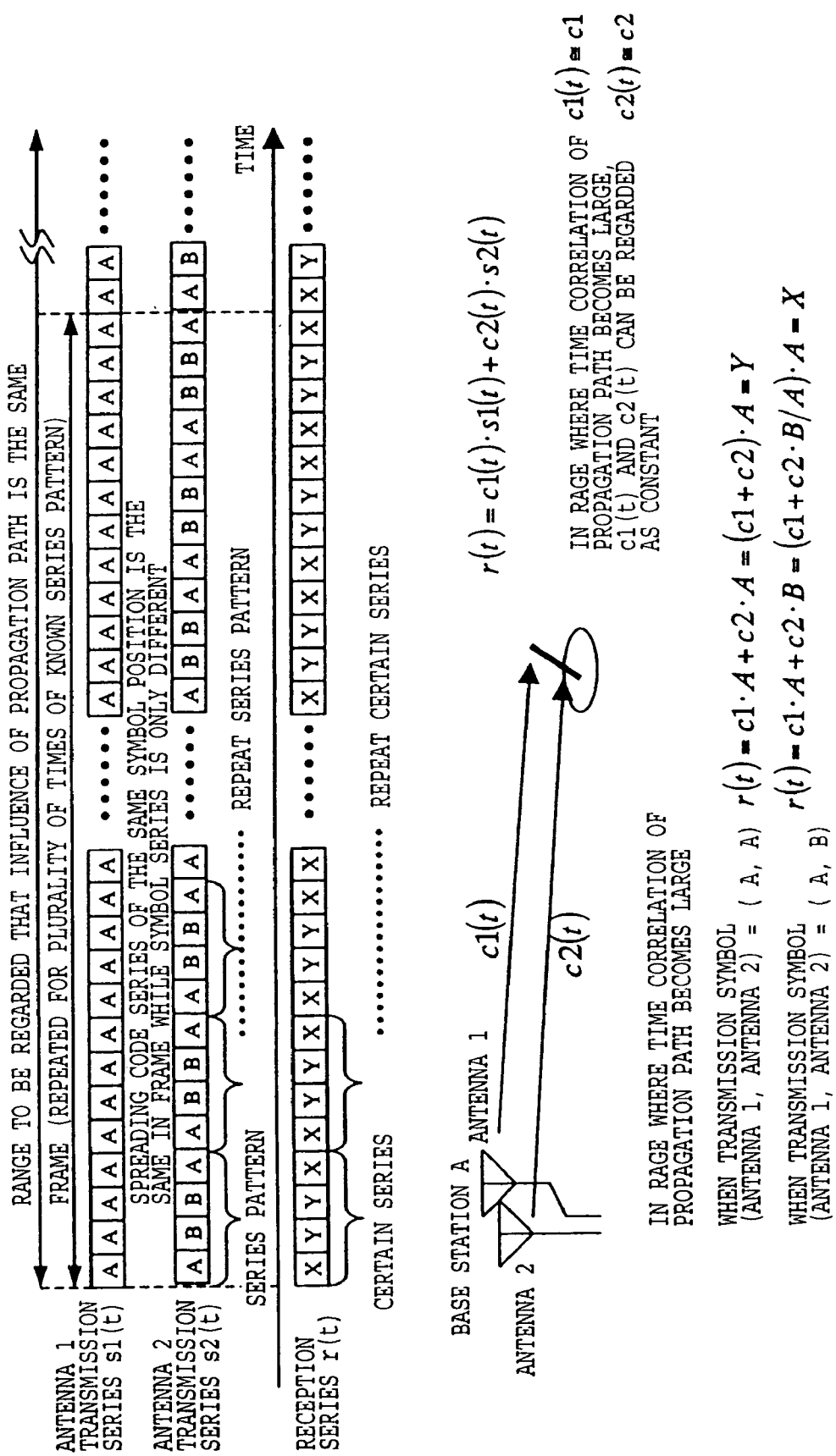
FIG. 30 is an illustration for explaining process for explaining correlation detection process in one embodiment of the present invention.

FIG. 30 is an illustration for explaining process for explaining correlation detection process in one embodiment of the present invention. In general, a transmission series $s1(t)$ from the antenna #1 and a transmission series $s2(t)$ from the antenna #2 are subject to respectively independent fading $c1(t)$ and $c2(t)$. These two series are received after combination in the space. Accordingly, ignoring transmission delay, a received series becomes $r(t)=c1(t)*s1(t)+c2(t)*s2(t)$. Here, considering a time range where influences of the propagation paths are regarded as the same, fading can be regarded as constant, $c1(t)=c1$ and $c2(t)=c2$. Therefore, the received series becomes a given value per combination of the transmission series s1(t) and s2(t).

For example, when the symbol of the transmission series of the antenna #1 at a certain timing is assumed as A and the symbol of the transmission series of the antenna #2 at the certain timing is assumed as A, the received series becomes X. When the symbol of the transmission series of the antenna #1 at a certain timing is assumed as A and the symbol of the transmission series of the antenna #2 at the certain timing is assumed as B, the received series becomes Y. As set forth above, in a time range where the influence of the propagation path is regarded as constant, the received series is determined only depending upon the transmission series.

In this circumstance, in the transmission series, if the regular pattern is periodically and repeatedly transmitted, certain series pattern is repeated in the same period in the received series. At this time, when a correlation value between the received series and the delayed received series delayed for a period of the regular series pattern is derived, the derived value becomes 1. Namely, the delayed received series delayed for the period of the transmitted series pattern and the received series are completely matched and the mutual correlation between the series becomes 1. Here, on transmission side, a unit where the known series pattern is repeated for a plurality of times is defined as frame.

Figure 31:
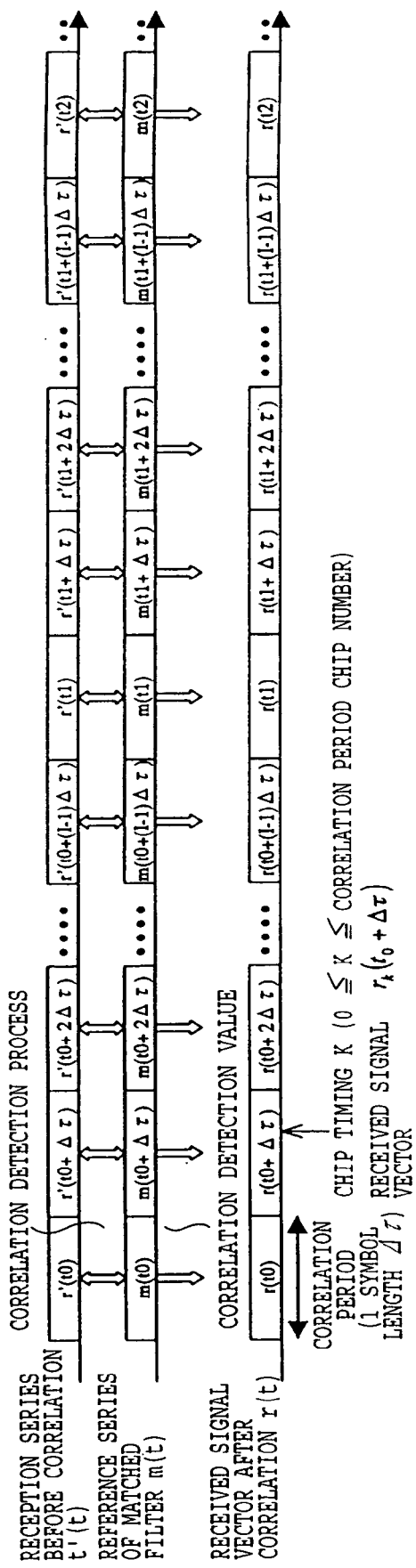
FIG. 31 is an illustration for explaining a correlation detection process in one embodiment of the present invention.

FIG. 31 shows a process of correlation detection in one embodiment of the present invention. A symbol as correlation unit taking $t_{j+1}+i\Delta\tau$ as leading end of the received series r'(t), is assumed as $r'(t_{j+1}+i\Delta\tau)$, and correlation detection process is performed by the correlation detector, such as matched filter set the code $m(t_{j+1}+i\Delta\tau)$ spreading respective of corresponding symbol, the received signal vector series $r(t_{j+1}+i\Delta\tau)$ after correlation can be obtained. Thus, the received signal vector is assumed as $r_k(t_{j+1}+i\Delta\tau)$. It should be noted that $\Delta\tau$ is a period of one symbol length, j is a repetition number of the series pattern in one frame, i is symbol number in the pattern, k is a reception chip timing in the symbol. On the other hand, it is assumed that information of the leading end position, the symbol position and so on of the channel frame to be measured are already known.

Figure 32:
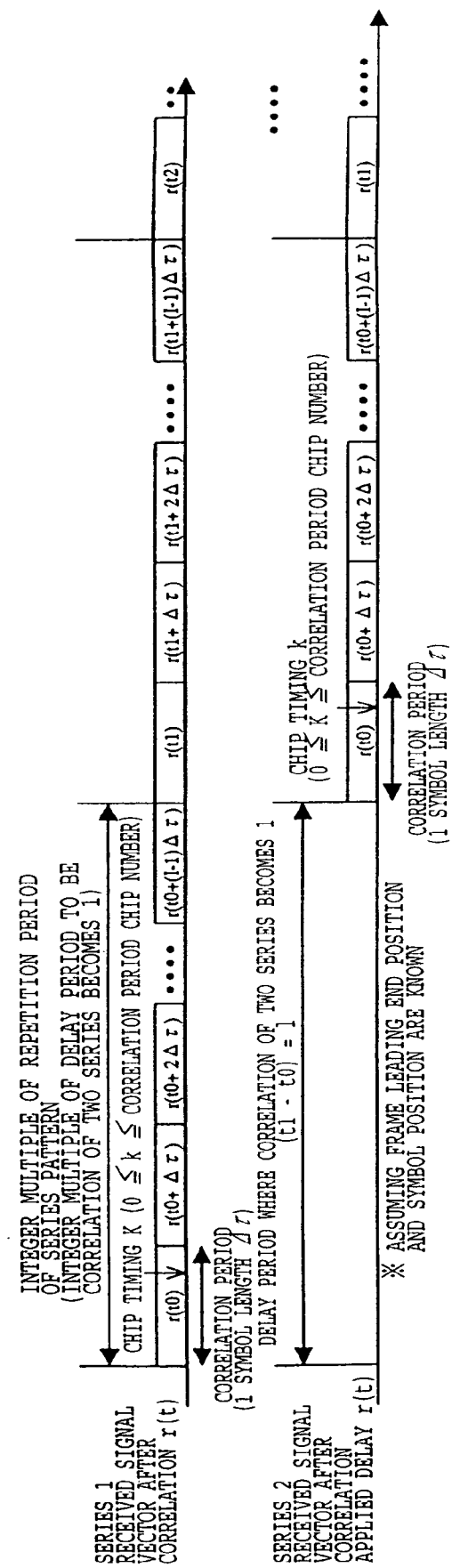
FIG. 32 is an illustration for explaining a delay process one embodiment of the present invention.

FIG. 32 shows a delay process in one embodiment of the present invention. With a preliminarily set delay symbol number I, by delaying the received signal vector series after correlation detection for delay symbol number I, the delayed received signal vector series is generated. The delay symbol number I us set at integer multiple of the repetition period of the transmission series pattern.

Figure 33:
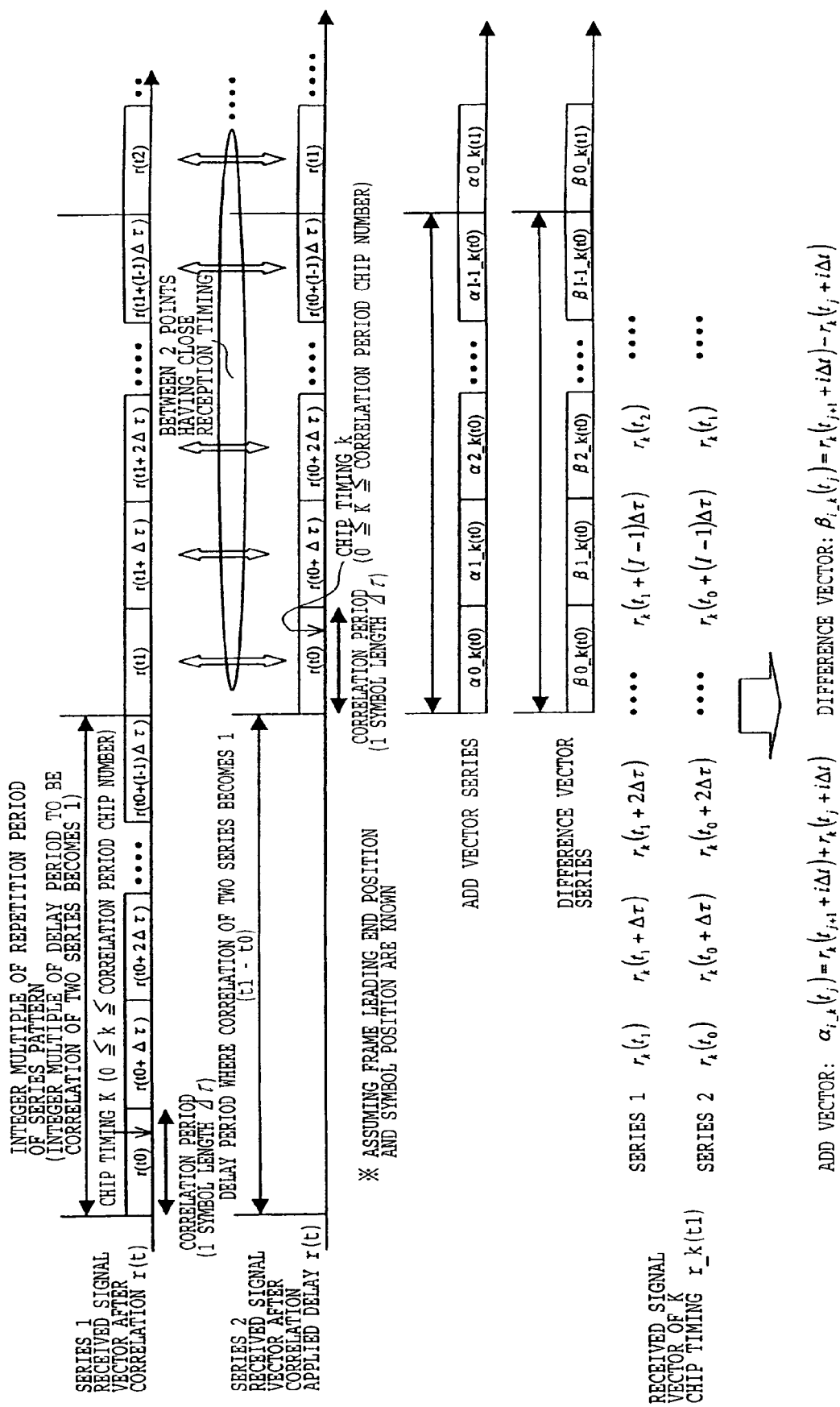
FIG. 33 is an illustration for explaining a vector calculation process in one embodiment of the present invention.

FIG. 33 shows vector calculation process in one embodiment of the present invention. In two time series data of the received signal vector series r(t) after correlation and the delayed received signal vector series $r(t-I\Delta\tau)$ delayed for delay symbol number I, the received signal vector $r_k(t_{j+1}+i\Delta\tau)$ in the reception chip timing k in the symbol and from difference and sum of the received signal vector series $r_k(t_{j+1}+i\Delta\tau-I\Delta\tau)$, namely $rk(t_j+i\Delta\tau)$ at the same reception chip timing, at which the series is delayed for delay symbol I, difference vector and add vector are derived. The add vector becomes $\alpha_{i\_k}(t_j)=r_k(t_{j+1}+i\Delta\tau)+r_k(t_j+i\Delta\tau)$ and the difference vector becomes $\beta_{i\_k}(t_j)=r_k(t_{j+1}+i\Delta\tau)-r_k(t_j+i\Delta\tau)$.

Figure 34:
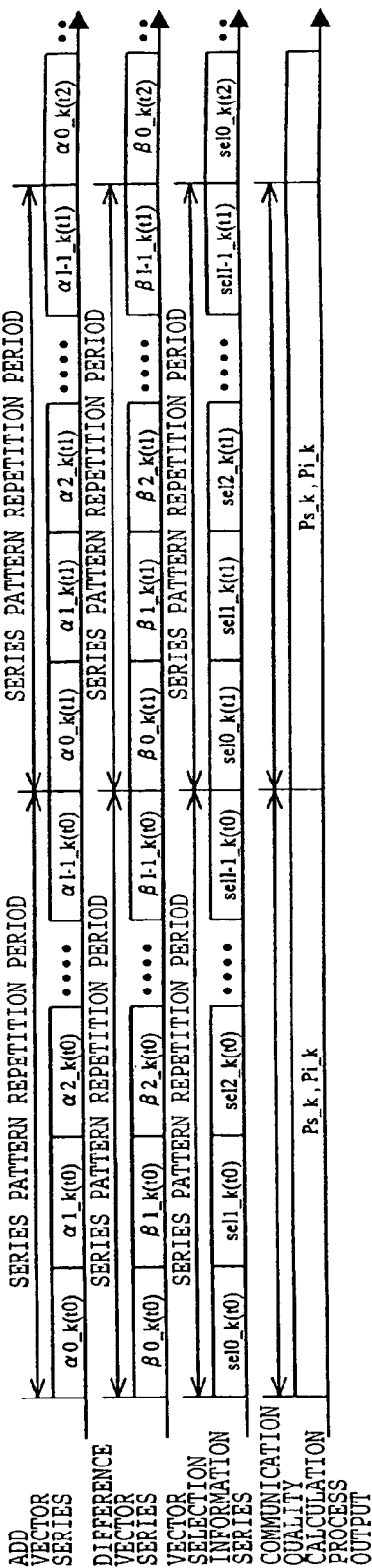
FIG. 34 is an illustration for explaining a vector selection process and communication quality calculating process in one embodiment of the present invention.

FIG. 34 shows a process of vector selection and a process of communication quality calculation in one embodiment of the present invention. The vector selection selects output of the vector calculation process to be input to the communication quality calculation process by a preliminarily set vector selection information $sel_{i\_k}(tj)$, namely the difference vector and the add vector. The vector selection information is information ON=1 and OFF=0 per symbol.

The communication quality calculation uses input add vector $\alpha'_{i\_k}(t_j)$ and the difference vector $\beta'_{i\_k}(t_j)$. From an average of the difference vector, the interference signal power is derived, and from an average of the add vector and the average of the difference vector, the desired signal power is derived. SIR is derived from a ratio of the desired signal power and the interference signal power.

Figure 35:
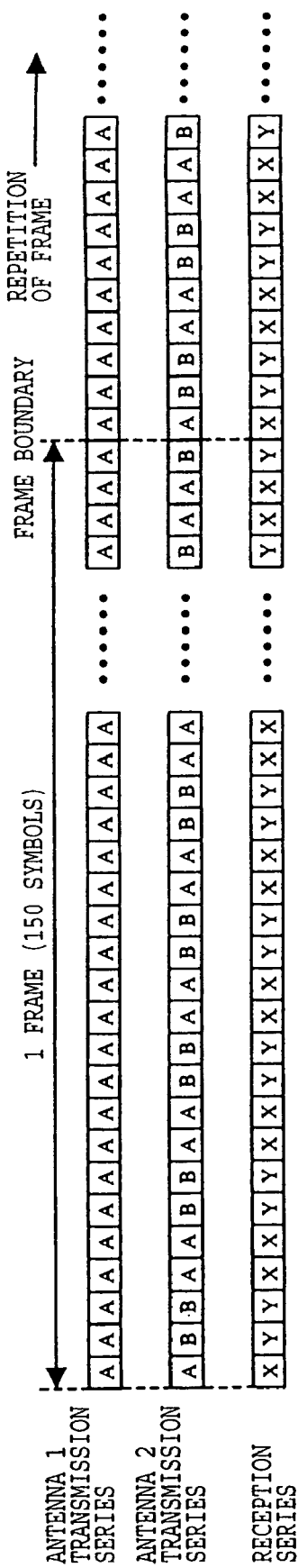
FIG. 35 is an illustration showing CPICH upon use of transmit diversity in the mobile communication system using W-CDMA system.

FIG. 35 shows CPICH upon use of the transmit diversity in the mobile communication system using W-CDMA cellular system. CPICH is consisted of 150 symbols per one frame, a symbol series consisted of four symbols (A, A, A, A) is transmitted from the antenna #1 and a symbol series consisted of four symbols (A, B, B, A) is transmitted from the antenna #2. Since the transmission symbol series is once reset per one frame, regularity of the four symbol period is not continued at the boundary of the frame. Therefore, in order to obtain a series where the correlation of the transmission symbol series becomes 1, the delay period has to be set at one frame. However, in case of the series provided such long delay should go beyond the range where the influence of the propagation path is constant to make it difficult to derive correct add vector and difference vector.

In order to avoid this, there are a method for selecting only correct add vector and the difference vector by setting the delay period to four symbols to avoid frame boundary, the delay period symbol is taken as one symbol, and a method for selecting only correct add vector and the difference vector appearing every other symbol with taking one symbol as the delay period symbol.

Figure 36:
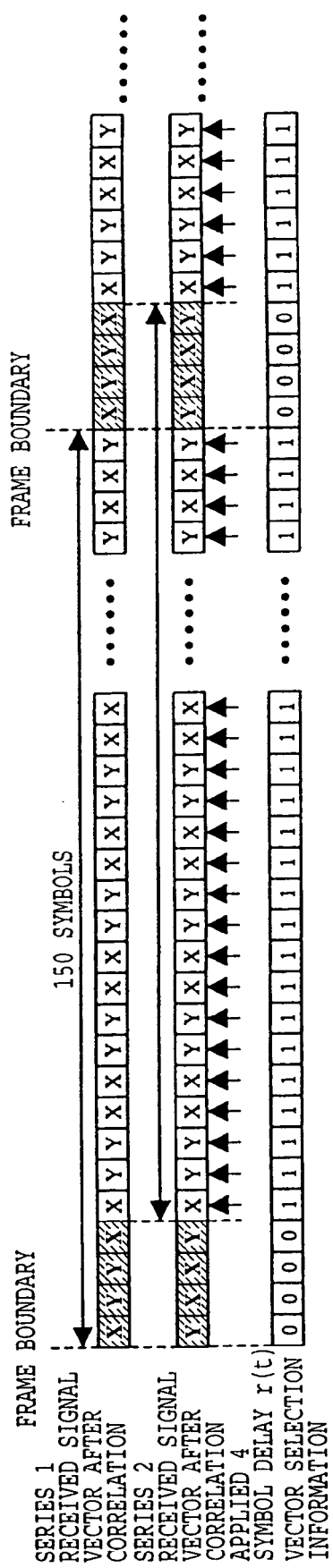
FIG. 36 is an illustration showing a principle of operation of the first embodiment of the communication quality measuring method while transmit diversity is applied, according to the present invention.

FIG. 36 shows a principle of operation of the first embodiment of the communication quality measuring method upon use of the transmit diversity according to the present invention. The synchronization detection is calculated with taking four symbols as the delay period. Among 150 symbols in one frame, 146 symbols matches symbol of the series 2, 4 symbols from the frame boundary do not match with the symbols in series 2. Therefore, the correlation value of the series 1 and the series 2 can not be 1. Since this make is difficult to derive correct add vector and difference vector, by setting the vector information of part of unmatched symbol in the frame boundary in the vector selection process, result of correct calculation can be obtained in the communication quality calculating process.

Figure 37:
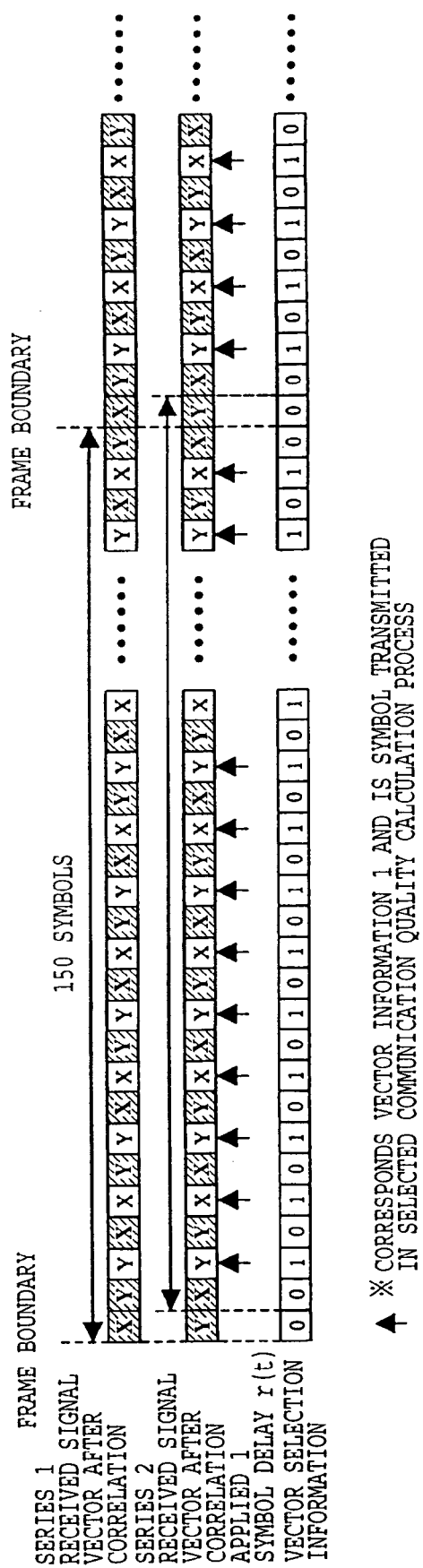
FIG. 37 is an illustration showing a principle of operation of the second embodiment of the communication quality measuring method while transmit diversity is applied, according to the present invention.

FIG. 37 shows a principle of operation of the second embodiment of the communication quality measuring method upon use of the transmit diversity according to the present invention. Communication quality is calculated with tasking one symbol as delay period. In the series 1, excluding first symbol from the leading end of the frame, odd number order symbol match with the symbols in the series 2, but even number order symbols from the leading end of the frame do not match. Therefore, the correlation value of the series 1 and series 2 does not become 1. With leaving this, correct add vector and the difference vector can be calculated. Therefore, by setting vector information to off=0 for the first and even number order symbols from the leading end of the frame, correct result of calculation can be obtained in the communication quality calculation process.

Figure 38:
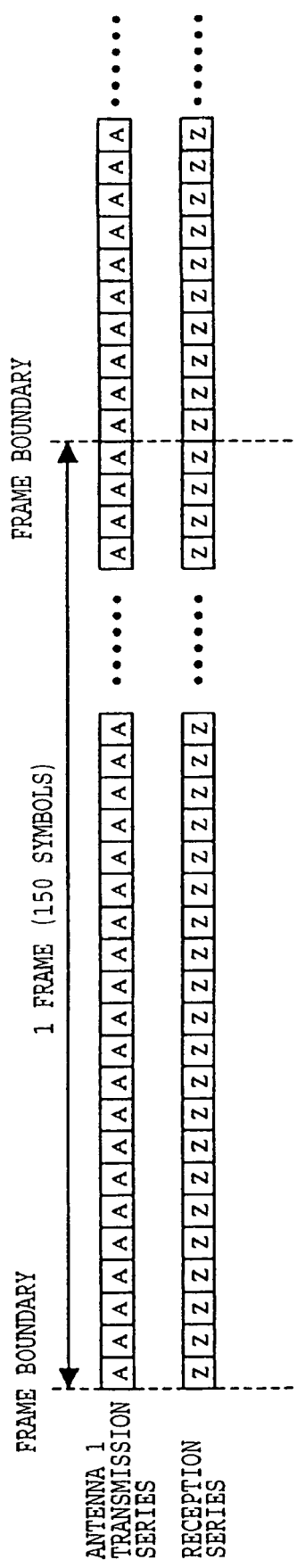
FIG. 38 is an illustration showing CPICH upon non-use of transmit diversity in the mobile communication system using W-CDMA system.

FIG. 38 shows CPICH when transmit diversity is not applied in the mobile communication system used in W-CDMA cellular system. The pilot channel is consisted of 150 symbols for one frame. A symbol series consisted of four symbols (A, A, A, A) is repeatedly transmitted only from the antenna #1 with taking four symbol as a period. While the transmission symbol series is reset per one frame, since symbol is constant, non-continuous at the frame boundary is not generated. Therefore, by applying any delay period, correlation of the transmission symbol series becomes 1. Accordingly, at arbitrary delay period where time correlation of the propagation path becomes small, correct add vector and difference vector can be derived.

This demonstrates capability of correct measurement of the desired signal power and the interference signal power when the transmit diversity is not applied using either the method of calculating the communication quality with taking four symbols as delay period as shown in FIG. 36 or the method of calculating the communication quality with taking one symbol as delay period as shown in FIG. 37. Accordingly, even when the base stations applying the transmit diversity and the base stations not applying the transmit diversity are present, it becomes unnecessary to change calculation method and the calculation method is used commonly.

Figure 39:
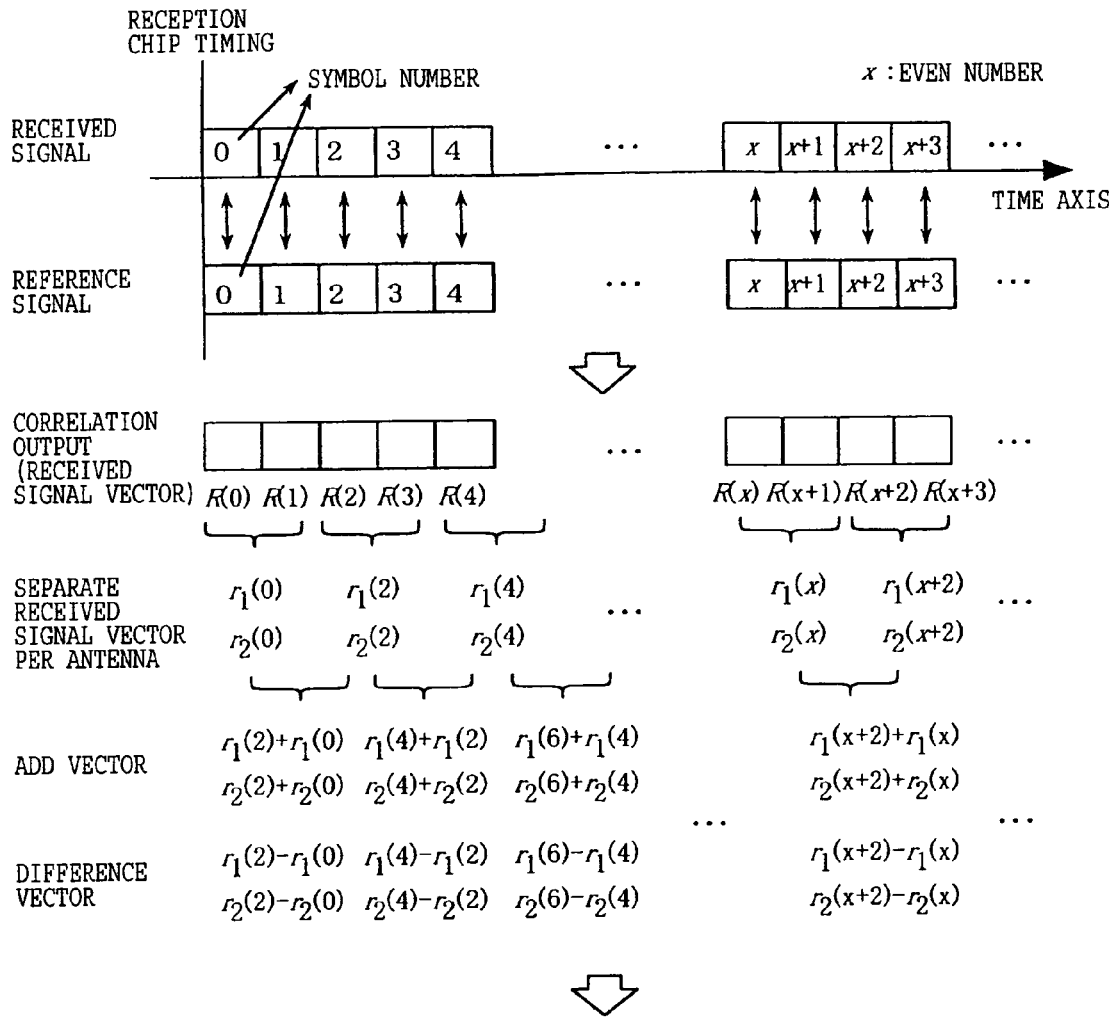
FIG. 39 is an illustration showing a principle of operation of the third embodiment of the communication quality measuring method while transmit diversity is used, according to the present invention.

FIG. 39 shows a principle of operation of the third embodiment of the communication quality measuring method upon use of the transmit diversity according to the present invention. With taking CPICH as channel to be measured upon use of the transmit diversity, the communication quality measuring method which does not require the vector selecting portion 223 shown in FIG. 29, is illustrated. The synchronization chip timing detected by the synchronization detecting portion 221 and accumulated in the synchronization chip timing information portion 225 is taken as reception chip timing. Then, detection of correlation is performed with modifying the spreading code of a reference signal adapting to the symbol number of the received signals. The received signal vector for each transmission antenna is calculated from the foregoing equation (4) using the received signal vector obtained by correlation detection.

Next, the add vector and the difference vector are generated per each transmission antenna. The desired signal power and the interference signal power upon use of transmit diversity are derived from the add vector and the difference vector for each antenna. In FIG. 39, N upon deriving the desired signal power and the interference signal power is number of samples of the add vector or the difference vector per one transmission antenna. For example, when the averaging period is 150 symbols (number of symbols in one frame), for example, N becomes 74. On the other hand, in FIG. 39, correlation detection is performed from the leading end of the frame for simplification, correlation detection is not necessarily performed from the leading end.

Figure 40:
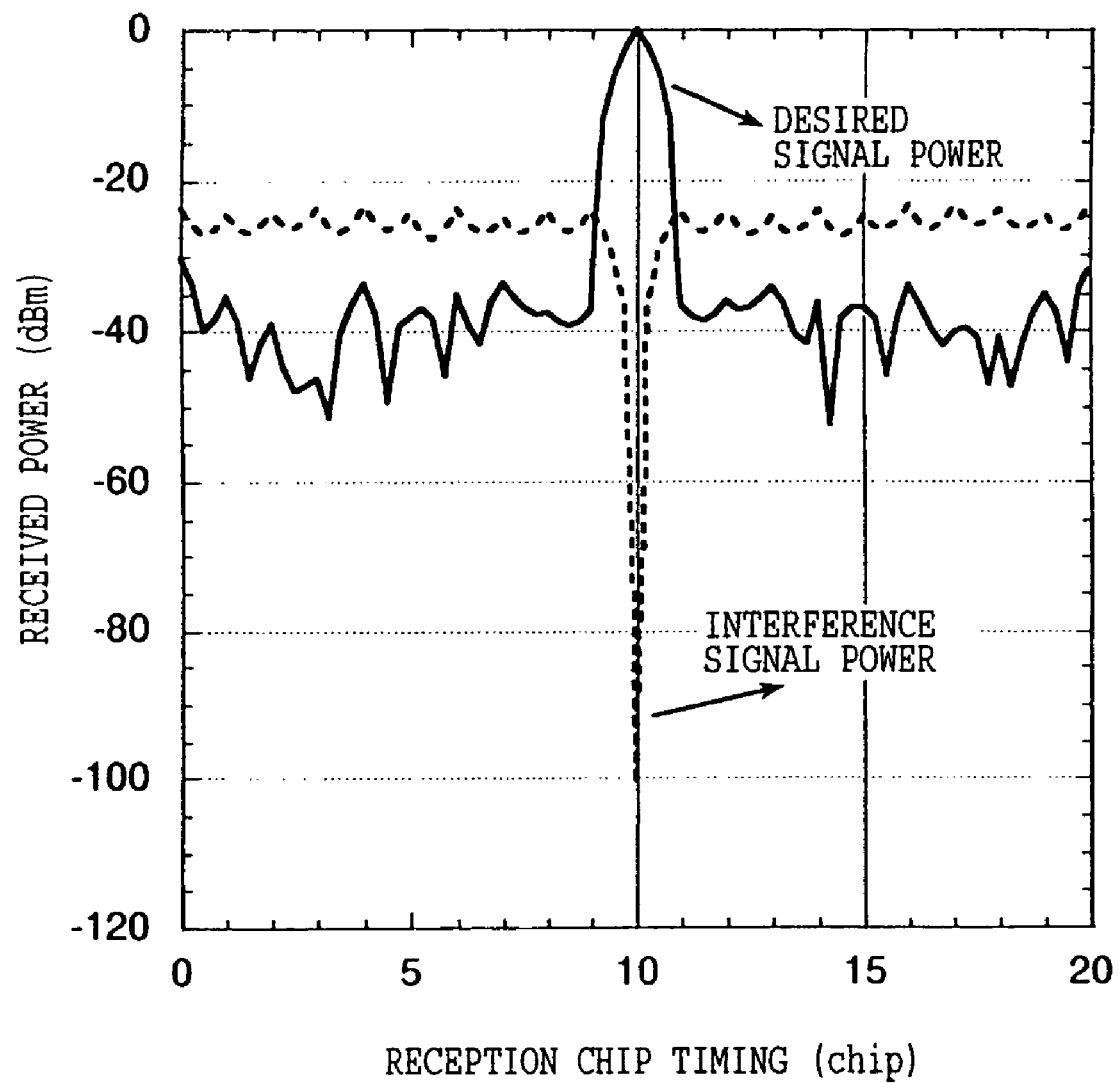
FIG. 40 is an illustration showing a result of simulation in the third embodiment of the communication quality measuring method upon use of transmit diversity.

FIG. 40 shows the result of simulation in the third embodiment of the communication quality measuring method upon use of transmit diversity. Under the premise of synchronization quality measurement using the measuring window, 4 times of over-sampling points is performed for the chip timing. Simulation is performed to set the received power of the desired signal at 0 dBm (−3 dBm for each antenna), the received power of the interference signal at −100 dBm, and the path position between transmitter and receiver at tenth chip in the measurement window. From FIG. 40, at set path position between transmitter and receiver, the desired signal power and the interference signal power can be calculated with high precision.

Figure 41:
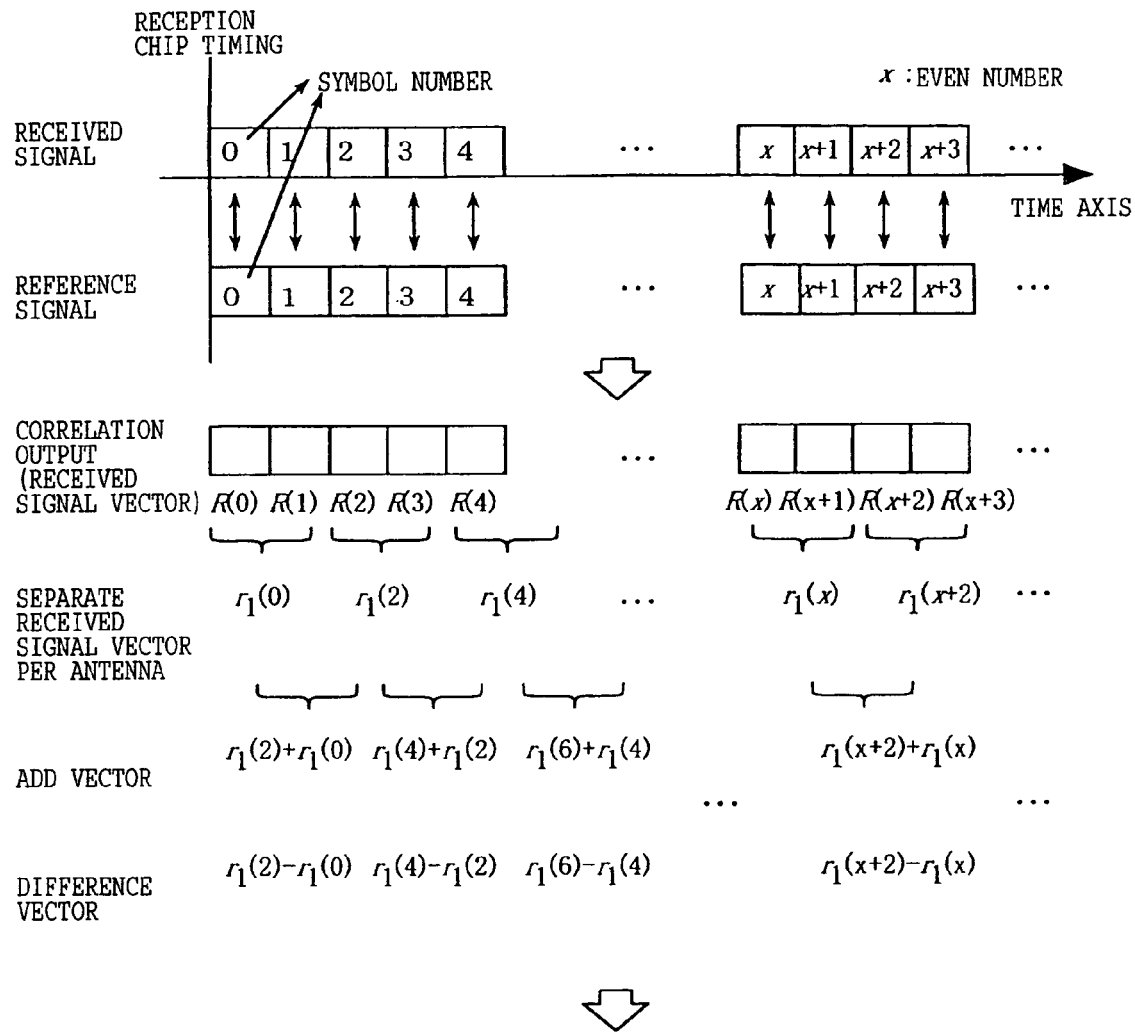
FIG. 41 is an illustration showing a principle of operation of the fourth embodiment of the communication quality measuring method while transmit diversity is applied, according to the present invention.

FIG. 41 shows a principle of operation of the fourth embodiment of the communication quality measuring method upon use of the transmit diversity according to the present invention. With taking CPICH as the channel to be measured upon applied of transmit diversity, the communication quality measuring method not requiring the vector selecting process 223 of FIG. 29 will be explained. In the shown embodiment, from the received signal vector obtained from correlation detection, only received signal vector for one transmission antenna is derived from the foregoing equation (4). Here, the transmission antenna to be selected is either antenna #1 or antenna #2. Calculation is simple as the antenna #1 is selected. In FIG. 41, the antenna #1 is selected as the selected transmission antenna.

Next, for the obtained received signal vector in one transmission antenna, the add vector and the difference vector are generated. The desired signal power and the interference signal power upon use of transmit diversity are calculated from the add vector and the difference vector. In FIG. 41, N upon deriving the desired signal power and the interference signal power is number of samples of the add vector or the difference vector per one transmission antenna. For example, when the averaging period is 150 symbols (number of symbols in one frame), for example, N becomes 74. On the other hand, upon derivation of the desired signal power and the interference signal power, $(P_{t1}+P_{t2})/P_{t1}$ is a correlation value which is a known value. Here, $P_{t1}$ and $P_{t2}$ are transmitting power of CPICH in each transmission antenna. It should be noted that, in FIG. 41, correlation detection is performed from the leading end of the frame for simplification. However, correlation detection can be not necessarily performed from the leading end.

Figure 42:
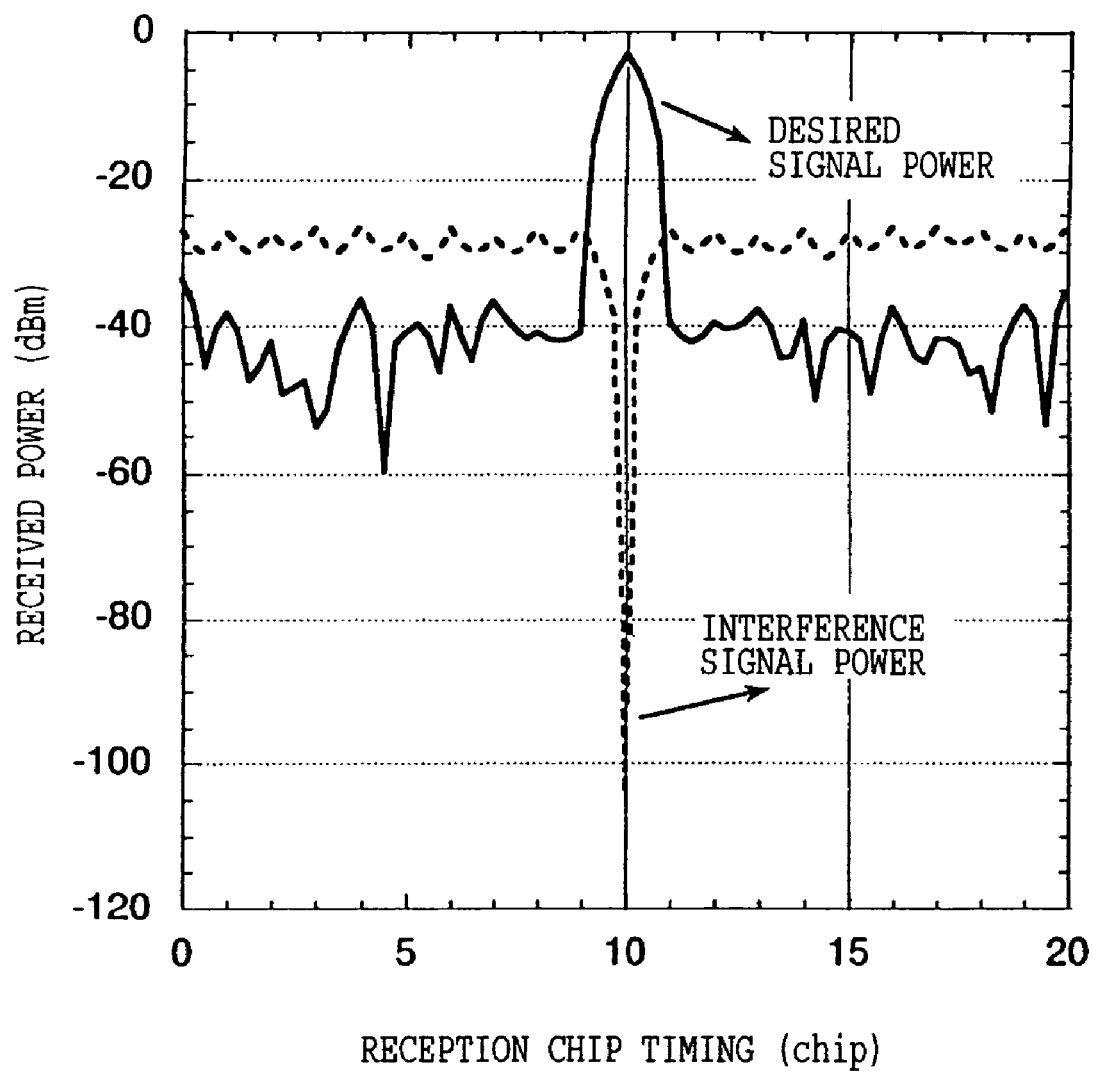
FIG. 42 is an illustration showing a result of simulation in the fourth embodiment of the communication quality measuring method upon use of transmit diversity.

FIG. 42 shows a result of simulation in the fourth embodiment of the communication quality measuring method upon use of transmit diversity. Condition of simulation is the same as FIG. 40. FIG. 42 shows the value before correction by the transmitting power. At the path position between the transmitter and receiver, it can be appreciated that the desired signal power and the interference signal power are calculated at −3 dB lower than the set values. On the other hand, the correction value is $(P_{t1}+P_{t2})/P_{t1}=2$ (3 dB). Accordingly, by adding the correction value of 3 dB, the desired signal power and the interference signal power can be correctly measured.

What is claimed is:

1. For measuring communication quality in a mobile receiving station in a mobile communication system employing a CDMA cellular system, using channel spread with a spreading code and constantly transmitted from a base station, a synchronization detecting method in CDMA cellular system comprising the steps of:

in said mobile receiving station, preliminarily setting an averaging period and sampling period in advance of performing synchronization detection;

detecting partial detection values between a spreading code to be measured and a received signal per said sampling period by sequentially rewriting the code in a matched filter; and determining a synchronization chip timing of a channel to be measured on the basis of a value derived by averaging of detected plurality of partial correlation values in said averaging period.

2. A synchronization detecting method in a CDMA cellular system as claimed in claim 1, wherein upon averaging of said detected plurality of partial correlation values, the synchronization chip timing of the channel to be measured is determined using an averaged value by preliminarily calculating said averaged value by a power averaging process or a vector averaging process.

3. A synchronization detecting method in a CDMA cellular system as claimed in claim 2, wherein the synchronization chip timing of the channel to be measured is determined by enabling setting of said averaging process for a plurality of times and using the averaged value derived by a plurality of times of averaging by the same or different averaging method in each process.

4. A synchronization detecting method in a CDMA cellular system comprising the steps of performing synchronization chip timing detection for a plurality of times as defined in any one of claims 1, 2 or 3, and making judgment whether synchronization chip timing of a channel to be measured is to be determined using an average value of a plurality of timing value and a standard deviation value, the synchronization chip timing of the channel to be measured is determined with providing a given range, or synchronization detection is to be performed again.

5. In a mobile communication system employing a CDMA cellular system using a common pilot channel constantly transmitted from a base station in a mobile communication system upon use of transmit diversity for measuring communication quality in a mobile station being measured, a synchronization detecting method in CDMA cellular system comprising the steps of:
   in said mobile station, separating a received signal vector obtained by correlation detection of received signal per symbol into a received signal vector per transmission antenna by performing addition and subtraction before and after a symbol, and
   determining synchronization chip timing on the basis of a value derived by addition of the received signal vector in power.

6. A synchronization detecting method in a CDMA cellular system as claimed in claim 5, wherein the synchronization chip timing is determined on the basis of a value derived by addition of an average vector derived by averaging a received signal vector per each of a plurality transmission antenna obtained over a plurality of periods with taking a unit where a symbol pattern of signals transmitted from a plurality of transmission antenna becomes orthogonal between antennas.

7. A synchronization detecting method in a CDMA cellular system determining synchronization chip timing on the basis of a value derived by performing synchronization chip timing detection defined in claim 5 or 6 for a plurality of times and averaging a plurality of values derived by addition of the received signal vector in power.

8. In a mobile communication system employing a CDMA cellular system using a common pilot channel constantly transmitted from a base station in a mobile communication system upon use of transmit diversity for measuring communication quality in a mobile station being measured, a synchronization detecting device in CDMA cellular system comprising:
   a first means for separating a received signal vector obtained by detecting correlation of received signal per symbol into a received signal vector per transmission antenna by performing addition and subtraction before and after a symbol, and
   a second means for determining synchronization chip timing on the basis of a value derived by addition of the received signal vector in power.

9. A synchronization detecting device in a CDMA cellular system as claimed in claim 8, wherein said second means determines the synchronization chip timing on the basis of a value derived by addition of an average vector derived by averaging a received signal vector per each of a plurality transmission antennas obtained over a plurality of periods with taking a unit where symbol pattern of signals transmitted from a plurality of transmission antenna becomes orthogonal between antennas.

10. A synchronization detecting device in a CDMA cellular system, wherein said synchronization detecting device determines the synchronization chip timing on the basis of a value derived by performing synchronization chip timing detection defined in claim 8 or 9 for a plurality of times and averaging a plurality of values derived by addition of the received signal vector in power.

* * * * *

UNITED STATES PATENT AND TRADEMARK OFFICE
CERTIFICATE OF CORRECTION

PATENT NO. : 7,333,529 B2
APPLICATION NO. : 11/139185
DATED : February 19, 2008
INVENTOR(S) : Tetsuro Imai et al.

It is certified that error appears in the above-identified patent and that said Letters Patent is hereby corrected as shown below:

Column 1
Line 1, change "during process" to -- during the process --

Column 2
Line 10, change "period" to -- periods --
Line 10, change "Accordingly, number" to -- Accordingly, the number --
Line 11, change "namely number" to -- namely the number --
Line 14, change "When number" to -- When the number --
Line 46, change "in measurement" to -- in a measurement --
Line 48, change "cannot be effective" to -- cannot be an effective --
Line 60, change "installing pseudo" to -- installing a pseudo --
Line 62, change "case" to -- cases --
Line 67, remove [as]

Column 3
Line 7, change "that number" to -- that the number --
Line 12, change "measured, channel" to -- measured, a channel --
Line 17, change "provides" to -- provide --
Line 35, change "detecting partial" to -- detecting a partial --
Line 62, change "by power" to -- by a power --

Column 4
Line 3, change "of averaging" to -- of the averaging --
Line 6, change "performing synchronization" to -- performing the synchronization --
Line 35, change "includes" to -- including --
Line 52, change "upon averaging" to -- upon the averaging --
Line 63, change "of averaging" to -- of the averaging --
Line 67, change "performing synch..." to -- performing a synch... --

Column 5
Line 16, change "CDMA" to -- a CDMA --
Line 20, change "separating received" to -- separating a received --
Line 34, change "averaging received" to -- averaging a received --
Line 35, change "plurality transmission" to -- plurality of transmission --
Line 36, change "period" to -- periods --
Line 37, change "symbol pattern" to -- a symbol pattern --

UNITED STATES PATENT AND TRADEMARK OFFICE
CERTIFICATE OF CORRECTION

PATENT NO. : 7,333,529 B2
APPLICATION NO. : 11/139185
DATED : February 19, 2008
INVENTOR(S) : Tetsuro Imai et al.

It is certified that error appears in the above-identified patent and that said Letters Patent is hereby corrected as shown below:

Line 43, change "performing synch..." to -- performing a synch... --
Line 46, change "of obtained" to -- of the obtained --
Line 49, change "CDMA" to -- a CDMA --
Line 67, change "averaging received" to -- averaging a received --
Line 67, change "plurality trans..." to -- plurality of trans... --

Column 6
Line 1, change "period" to -- periods --
Line 2, change "where symbol" to -- where a symbol --
Line 6, change "in CDMA" to -- in a CDMA --
Line 8, change "performing synch..." to -- performing a synch... --
Line 9, change "in sixteenth" to -- in the sixteenth --
Line 11, change "of obtained" to -- of the obtained --

Column 7
Line 52, change "explaining process" to -- explaining the process --
Line 53, change "explaining correlation" to -- explaining the correlation --
Line 59, change "one embodiment" to -- in one embodiment --

Column 9
Line 37, change "chip timing" to -- chip timings --
Line 44, change "among respective" to -- among a respective --
Line 48, change "W-CDMA" to -- a W-CDMA --
Line 66, change "is explanatory" to -- is an explanatory --

Column 10
Line 18, change "shows principle" to -- shows a principle --
Line 23, change "using obtained" to -- using an obtained --
Line 24, change "that number" to -- that the number --
Line 25, change "candidate" to -- candidates --
Line 26, change "fir" to -- for --
Line 27, change "there are" to -- there is --
Line 28, change "perform power" to -- perform the power --
Line 29, change "perform vector" to -- perform the vector --
Line 31, change "as equalizing" to -- as an equalization --
Line 51, change "performing power" to -- performing the power --

UNITED STATES PATENT AND TRADEMARK OFFICE
CERTIFICATE OF CORRECTION

PATENT NO.        : 7,333,529 B2
APPLICATION NO.   : 11/139185
DATED             : February 19, 2008
INVENTOR(S)       : Tetsuro Imai et al.

It is certified that error appears in the above-identified patent and that said Letters Patent is hereby corrected as shown below:

Column 11
Line 5, change "candidate" to -- candidates --
Line 5, change "timing" to -- timings --
Line 18, change "measures" to -- measured --
Line 46, change "S6" to -- S26 --
Line 53, change "candidate" to -- candidates --
Line 59, change "is further" to -- is a further --
Line 61, change "process of" to -- the process of --
Line 63, change "measures" to -- measured --
Line 66, change "embodiment, averaging" to -- embodiment, the averaging --

Column 12
Line 34, change "candidate" to -- candidates --
Line 34, change "timing" to -- timings --
Line 36, change "candidate" to -- candidates --
Line 37, change "timing" to -- timings --
Line 43, change "performing synch..." to -- performing a synch... --
Line 48, change "embodiment, check" to -- embodiment, a check --
Line 54, change "as object" to -- as the object --
Line 58, change "within certain" to -- within a certain --
Line 60, change "in measurement" to -- in the measurement --

Column 13
Line 1, change "successful" to -- successfully --
Line 3, change "that probability" to -- that the probability --
Line 4, change "to again initiate" to -- and again initiates --
Line 11, change "propagation path" to -- the propagation path --
Line 13, change "upon propagation" to -- upon the propagation --
Line 17/18, change "provided modulation" to -- provided through modulation --
Line 19, change "that symbol" to -- that the symbol --
Line 32, change "is interference" to -- is the interference --
Line 34, change "is detection" to -- is a detection --
Line 37, change "is derivation" to -- is a derivation --
Line 49, change "is even number" to -- is an even number --

UNITED STATES PATENT AND TRADEMARK OFFICE
CERTIFICATE OF CORRECTION

PATENT NO.        : 7,333,529 B2
APPLICATION NO.   : 11/139185
DATED             : February 19, 2008
INVENTOR(S)       : Tetsuro Imai et al.

It is certified that error appears in the above-identified patent and that said Letters Patent is hereby corrected as shown below:

Column 14
Line 2, change "detects leading" to -- detects the leading --
Line 6, change "that unit" to -- that the unit --
Line 9, change "number" to -- numbers --
Line 10, change "using spreading" to -- using the spreading --
Line 12, change "vector" to -- vectors --
Line 15, change "When matched" to -- When a matched --
Line 15/16, change "used in correlation" to -- used in a correlation --
Line 16, change "finish correlation" to -- finish the correlation --
Line 21/22, change "Here, number" to -- Here, the number --
Line 32, change "for number" to -- for the number --
Line 33, change "by synch..." to -- by the synch... --
Line 58, change "timing" to -- timings --
Line 60, change "timing" to -- timings --

Column 15
Line 9, change "means for" to -- means 2302 for --
Line 10/11, change "as component" to -- as a component --
Line 16, change "value" to -- values --
Line 31, change "(averaged period." to -- (averaged period.) --
Line 34, change "Next, covariant" to -- Next, a covariant --
Line 35/36, change "performing operation" to -- performing the operation --
Line 46, change "interval" to -- intervals --

Column 16
Line 6, change "more simple" to -- a simpler --
Line 12, change "by operation" to -- by the operation --
Line 14, change "in number" to -- in a number --
Line 27, change "required, matrix" to -- required, the matrix --
Line 38, change "as interference" to -- as an interference --
Line 39/40, change "as interference" to -- as an interference --
Line 45, change "perform" to -- performed --
Line 51, change "embodiments, more" to -- embodiments, a more --
Line 53, change "values" to -- value --
Line 64, change "Condition of simulation is" to -- Conditions of simulation are --
Line 65, change "for averaging" to -- for the averaging --

UNITED STATES PATENT AND TRADEMARK OFFICE
CERTIFICATE OF CORRECTION

PATENT NO. : 7,333,529 B2
APPLICATION NO. : 11/139185
DATED : February 19, 2008
INVENTOR(S) : Tetsuro Imai et al.

It is certified that error appears in the above-identified patent and that said Letters Patent is hereby corrected as shown below:

Column 17
Line 6, change "embodiment number" to -- embodiment the number --
Line 11, change "of other" to -- of the other --
Line 14, remove [since]
Line 17, change "when number" to -- when the number --
Line 18, change "is large" to -- is a large --
Line 19, change "within sampling" to -- within the sampling --
Line 24, change "embodiment, primary" to -- embodiment, the primary --
Line 25, change "within sampling" to -- within a sampling --
Line 37, change "of obtained" to -- of the obtained --

Column 18
Line 57, remove [for explaining process]
Line 58, change "explaining correlation" to -- explaining the correlation --

Column 19
Line 16/17, change "transmitted, certain" to -- transmitted, a certain --
Line 24/25, change "on transmission" to -- on the transmission --
Line 30, change "and correlation" to -- and the correlation --
Line 37/38, change "is symbol" to -- is a symbol --
Line 48, change "us" to -- is --
Line 50, change "shows vector" to -- shows a vector --

Column 20
Line 25, change "there are" to -- there is --
Line 25/26, change "only correct" to -- only the correct --
Line 37, change "matches" to -- match the --
Line 40, change "Since this make is" to -- This makes it --
Line 41, change "derive correct" to -- derive the correct --
Line 41, change "difference vector," to -- difference vector. --
Line 42, change "by" to -- By --
Line 42, change "part of unmatched" to -- the part of the unmatched --
Line 43, change "result of" to -- a --
Line 50, change "tasking" to -- taking --
Line 50/51, change "excluding first" to -- excluding the first --
Line 51, change "frame, odd" to -- frame, the odd --

UNITED STATES PATENT AND TRADEMARK OFFICE
CERTIFICATE OF CORRECTION

PATENT NO. : 7,333,529 B2
APPLICATION NO. : 11/139185
DATED : February 19, 2008
INVENTOR(S) : Tetsuro Imai et al.

It is certified that error appears in the above-identified patent and that said Letters Patent is hereby corrected as shown below:

Line 52, change "order symbol" to -- order symbols --
Line 53, change "but even" to -- but the even --
Line 56, change "this, correct" to -- this, the correct --
Line 59, change "frame, correct" to -- frame, the correct --
Line 62/63, change "in W-CDMA" to -- in a W-CDMA --
Line 66, change "symbol" to -- symbols --

Column 21
Line 1, change "since symbol" to -- since the symbol --
Line 4, change "at arbitrary" to -- at an arbitrary --
Line 7, change "demonstrates capability" to -- demonstrates the capability --
Line 17, change "method and" to -- methods and --
Line 47, change "simplification, correlation" to -- simplification, however, correlation --
Line 58, change "at set" to -- at a set --
Line 66, change "applied" to -- application --

Column 22
Line 3, change "only received" to -- only the received --
Line 15, change "is number" to -- is the number --
Line 22, change "are transmitting" to -- are the transmitting --

Signed and Sealed this

Sixth Day of January, 2009

JON W. DUDAS
*Director of the United States Patent and Trademark Office*